(12) United States Patent
Hori et al.

(10) Patent No.: US 11,505,121 B2
(45) Date of Patent: Nov. 22, 2022

(54) MOUNTING ASSEMBLY OF LIGHTING DEVICE AND VEHICULAR INTERIOR COMPONENT

(71) Applicant: TOYOTA BOSHOKU KABUSHIKI KAISHA, Aichi-ken (JP)

(72) Inventors: Akifumi Hori, Aichi-ken (JP); Ai Morishima, Aichi-ken (JP); Takamasa Yamada, Aichi-ken (JP); Hiroyasu Tahara, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 17/494,189

(22) Filed: Oct. 5, 2021

(65) Prior Publication Data

US 2022/0111791 A1 Apr. 14, 2022

(30) Foreign Application Priority Data

Oct. 12, 2020 (JP) .............................. JP2020-171998
Oct. 12, 2020 (JP) .............................. JP2020-171999
Oct. 12, 2020 (JP) .............................. JP2020-172000

(51) Int. Cl.
*B60Q 3/54* (2017.01)
*B60Q 3/64* (2017.01)
(Continued)

(52) U.S. Cl.
CPC ................. *B60Q 3/54* (2017.02); *B60Q 3/20* (2017.02); *B60Q 3/267* (2017.02); *B60Q 3/64* (2017.02); *B60Q 3/78* (2017.02)

(58) Field of Classification Search
CPC ... B60Q 3/54; B60Q 3/64; B60Q 3/78; B60Q 3/267; B60Q 2500/10; B60Q 3/20
(Continued)

(56) References Cited

U.S. PATENT DOCUMENTS 6,594,417 B1* 7/2003 Hulse ....................... B60Q 3/78
385/901
2013/0094233 A1* 4/2013 Ukai ........................ B60Q 3/51
362/511

(Continued)

FOREIGN PATENT DOCUMENTS

JP 2008-143425 A 6/2008
JP 5320415 B 10/2013
(Continued)

*Primary Examiner* — Laura K Tso
(74) *Attorney, Agent, or Firm* — Greenblum & Bernstein, P.L.C.

(57) ABSTRACT

A mounting assembly includes a lighting device, a vehicular interior component, and a light guide member mounting member with which the light guide member is mounted on the vehicular interior component. The lighting device includes a light source and a long light guide member. The vehicular interior component includes a through hole and a receiving member that includes a stopper hole near the through hole. The light guide member mounting member includes a support portion and a fitting portion that extends from the support portion and is fitted to the stopper hole. The support portion includes a curved wall that has a space defined by the curved wall and receives and supports a portion of the light guide member in the space to be opposite the through hole such that the light exits the light guide member is supplied to a vehicular interior surface side of the vehicular interior component.

23 Claims, 25 Drawing Sheets

(51) Int. Cl.
  *B60Q 3/267* (2017.01)
  *B60Q 3/78* (2017.01)
  *B60Q 3/20* (2017.01)

(58) Field of Classification Search
  USPC .................................................. 362/511, 488
  See application file for complete search history.

(56) References Cited

U.S. PATENT DOCUMENTS

| | | | |
|---|---|---|---|
| 2014/0226353 A1* | 8/2014 | Sohizad ................ | F21V 21/088 29/428 |
| 2015/0003093 A1* | 1/2015 | Omura ..................... | B60Q 3/78 362/511 |
| 2016/0107566 A1* | 4/2016 | Gasahl, IV .............. | B60Q 3/78 362/581 |
| 2020/0317122 A1* | 10/2020 | Mihira ...................... | B60J 5/00 |
| 2021/0354623 A1* | 11/2021 | Kasuya .................... | B60Q 3/64 |

FOREIGN PATENT DOCUMENTS

| | | | |
|---|---|---|---|
| JP | 2014-181006 A | | 9/2014 |
| WO | WO20190231723 | * | 5/2019 |
| WO | WO-2020026753 A1 | * | 2/2020 |

* cited by examiner

MOUNTING ASSEMBLY OF LIGHTING DEVICE AND VEHICULAR INTERIOR COMPONENT

CROSS REFERENCE TO RELATED APPLICATION

This application claims priority from Japanese Patent Application Nos. 2020-171998 filed on Oct. 12, 2020, 2020-171999 filed on Oct. 12, 2020, and 2020-172000 filed on Oct. 12, 2020. The entire contents of the priority application are incorporated herein by reference.

TECHNICAL FIELD

The present technology described herein relates to a mounting assembly of a lighting device and a vehicular interior component.

BACKGROUND

An interior component of a vehicle such as an automobile may include a lighting device that exits linear light. For example, an interior lighting device includes a light source and a linear light guide member that guides light emitted by the light source. Such a lighting device is mounted on an exterior surface side of the vehicular interior component including a lighting hole and the light exists through the lighting hole toward an interior side.

SUMMARY

However, it is difficult to arrange the linear light guide member, which is long, in an appropriate position of the vehicular interior component easily, stably, and precisely.

An object of the present technology described herein is to provide an assembly of a lighting device and a vehicular interior component in which a long light guide member can be mounted in an appropriate position of the vehicular interior component easily, stably, and precisely.

A mounting assembly of a lighting device and a vehicular interior component according to the technology described herein includes the lighting device, the vehicular interior component, and a light guide member mounting member with which the light guide member is mounted on a vehicular exterior surface side of the vehicular interior component. The lighting device includes a light source and a light guide member that is long and includes a first end portion having a first end surface as a light entering surface through which light emitted by the light source enters and a second end portion having a second end surface that is an opposite end from the first end surface. Light emitted by the light source travels within the light guide member. The vehicular interior component has a plate shape and has a vehicular interior surface and a vehicular exterior surface. The vehicular interior component includes a through hole that extends from the vehicular interior surface to the vehicular exterior surface, and a receiving member including a stopper hole near the through hole. The light guide member mounting member includes a light guide member holder that is disposed on the vehicular exterior surface side of the vehicular interior component. The light guide member holder includes a support portion and a fitting portion. The support portion includes a curved wall having a space that is defined by the curved wall. The curved wall receives and supports a portion of the light guide member in the space to be opposite the through hole such that the light exits the light guide member is supplied to a vehicular interior surface side of the vehicular interior component. The fitting portion extends from the support portion and is fitted to the stopper hole of the receiving member.

DETAILED DESCRIPTION

Figure 1:
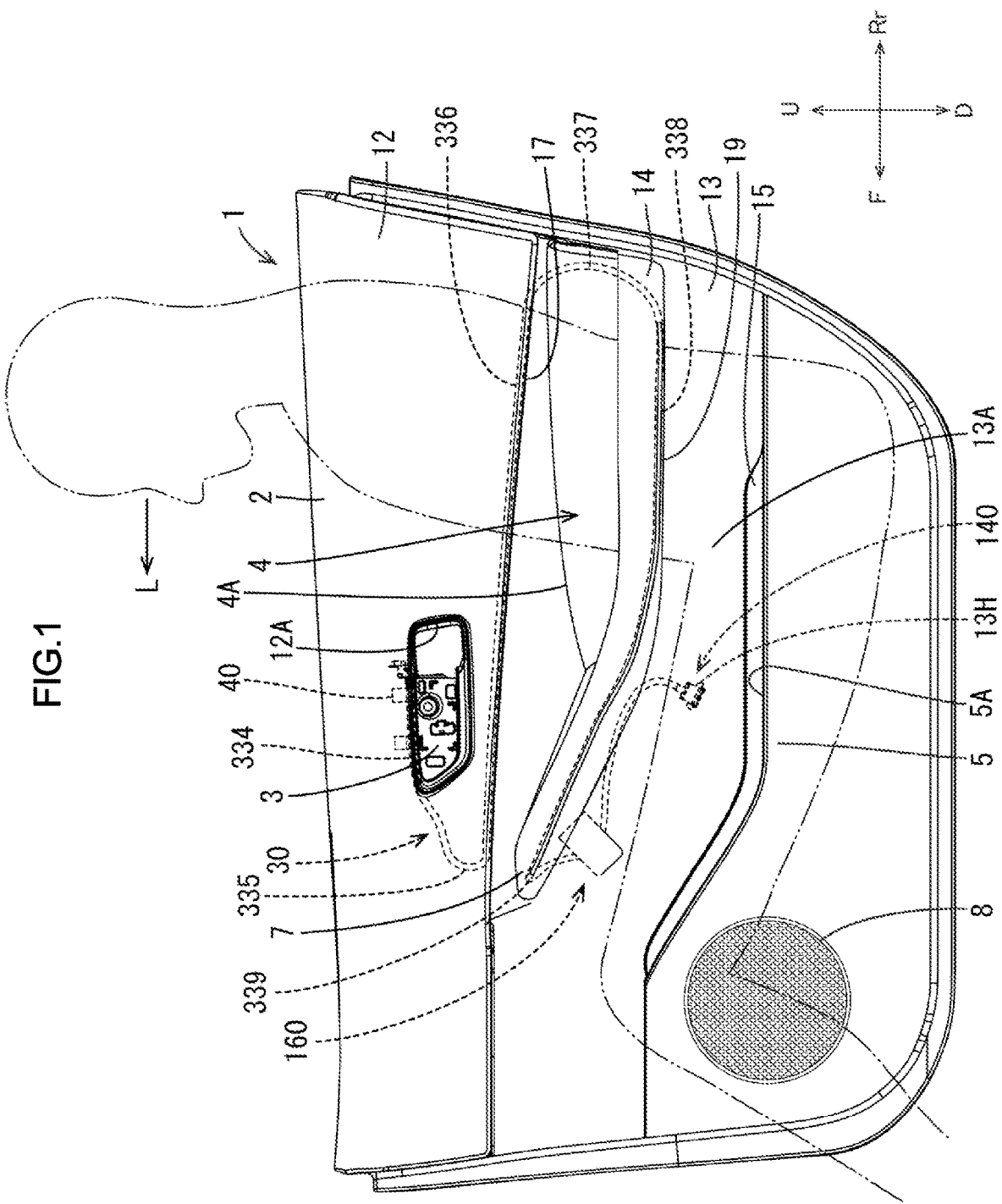
FIG. 1 is a front surface side view illustrating a door trim seen from a vehicular interior side.

Examples of a mounting assembly of a lighting device and a vehicular interior component will be described with reference to FIGS. 1 to 24. The symbols of F, Rr, U, D, IN, and OUT illustrated in each drawing represent a front side and a rear side with respect to a vehicular forwarding direction, an upper side and a lower side with respect to the vertical direction, a vehicular interior side and a vehicular exterior side, respectively. The directions are defined for convenience and are not limited to those described in the drawings.

<Door Trim>

A configuration of a door trim 1 (one example of a vehicular interior component) will be described with reference to FIGS. 1 and 2. The door trim 1 includes a trim board 2 and is mounted on a vehicular interior side with respect to a metal door inner panel and fixed to the door inner panel with a fixing member such as a clip to improve appearance of the vehicular interior surface and increasing comfort in the vehicular compartment. The trim board 2 may be made of synthetic resin (thermoplastic resin) such as polypropylene or may be made of composite material obtained by mixing a plant fiber (such as kenaf) and synthetic resin. In the following description, the vehicular interior side and the vehicular exterior side with respect to the trim board 2 may be referred to as a front side and a back side, respectively.

<Trim Board>

As illustrated in FIG. 1, the door trim 1 includes various functional components such as a door inside handle bezel 3 (a handle housing portion), an armrest 4, a door pocket 5, and a speaker grill 8. The trim board 2 includes board members that are fitted to each other in relation to the mountability and the design of the functional components. The trim board 2 of this embodiment includes an upper board 12, a lower board 13, an armrest board 14, and a pocket board 15. The front surface of the trim board 2 may be covered with a skin made of natural leather, synthetic leather, or a woven fabric.

The upper board 12 is an upper section of the trim board 2 and has a round shape projecting toward the vehicular interior side with respect to the door inner panel. The upper board 12 includes a body member 12G having a handle hole 12A in a middle section thereof with respect to the front-rear direction and a lower section. A door inside handle that is mounted on the door inner panel is to be inserted in the handle hole 12A. The handle hole 12A has a large opening such that a holding member of the door inside handle can be inserted through the handle hole 12A to the vehicular interior side when the trim board 2 is mounted on the door inner panel. The door inside handle bezel 3 is fitted into the handle hole 12A of the upper board 12 from the vehicular interior side and therefore, the door inner panel is not seen from the vehicular interior side. The door inside handle bezel 3 is one example of the vehicular interior component. The lower board 13 is disposed below the upper board 12.

The armrest board 14 is disposed on an upper side and a front side of the lower board 13. The armrest board 14 extends from a middle section to a rear section of the lower board 13 in the front-rear direction. The armrest board 14 projects toward the vehicular interior side to be configured as the armrest 4. An occupant who is seated on a seat puts the occupant's arm on the armrest 4. The armrest board 14 includes an upper surface 4A facing upward and the upper surface extends horizontally from the surface (the vehicular interior surface) of the trim board 2 toward the vehicular interior side. The armrest board 14 includes holes in front and rear sections of the upper surface. A switch member for opening and closing a door window is mounted in the hole in the front section. An armrest pocket member in which small items can be put is mounted in the hole in the rear section. The upper surface of the front section extends upward as it extends frontward and the upper surface of the rear section gently extends upward as it extends rearward. The armrest board 14 is designed such that an occupant can smoothly move his or her arm from the armrest 4 to the door inside handle.

The armrest 4 includes a door grip 7 in a front end section thereof. The occupant holds the door grip 7 when the occupant opens and closes the door or puts his or her arm on the armrest 4. The door grip 7 has a round shape projecting upward and toward the vehicular interior side with respect to the horizontal upper surface of the armrest 4.

The lower board 13 projects toward the vehicular interior side in a lower section thereof and includes a pocket opening 5A in an upper section of the projected portion. A pocket board 15 is fixed to the lower board 13 and is disposed on the back side (the vehicular exterior side) of the projected portion, which corresponds to the door pocket 5. The door pocket 5 that opens upward is defined between the lower board 13 and the pocket board 15.

<Lighting Device>

Such a door trim 1 may include a lighting device in the door inside handle bezel 3, a border section between the upper board 12 and the lower board 13, the front section of the armrest 4, and the door pocket 5 to improve the occupants' visibility of each of the above sections and lighting decoration of the vehicular compartment. The door trim 1 of this embodiment includes a lighting device 30 that can provide light to the sections of the trim board 2.

Figure 3:
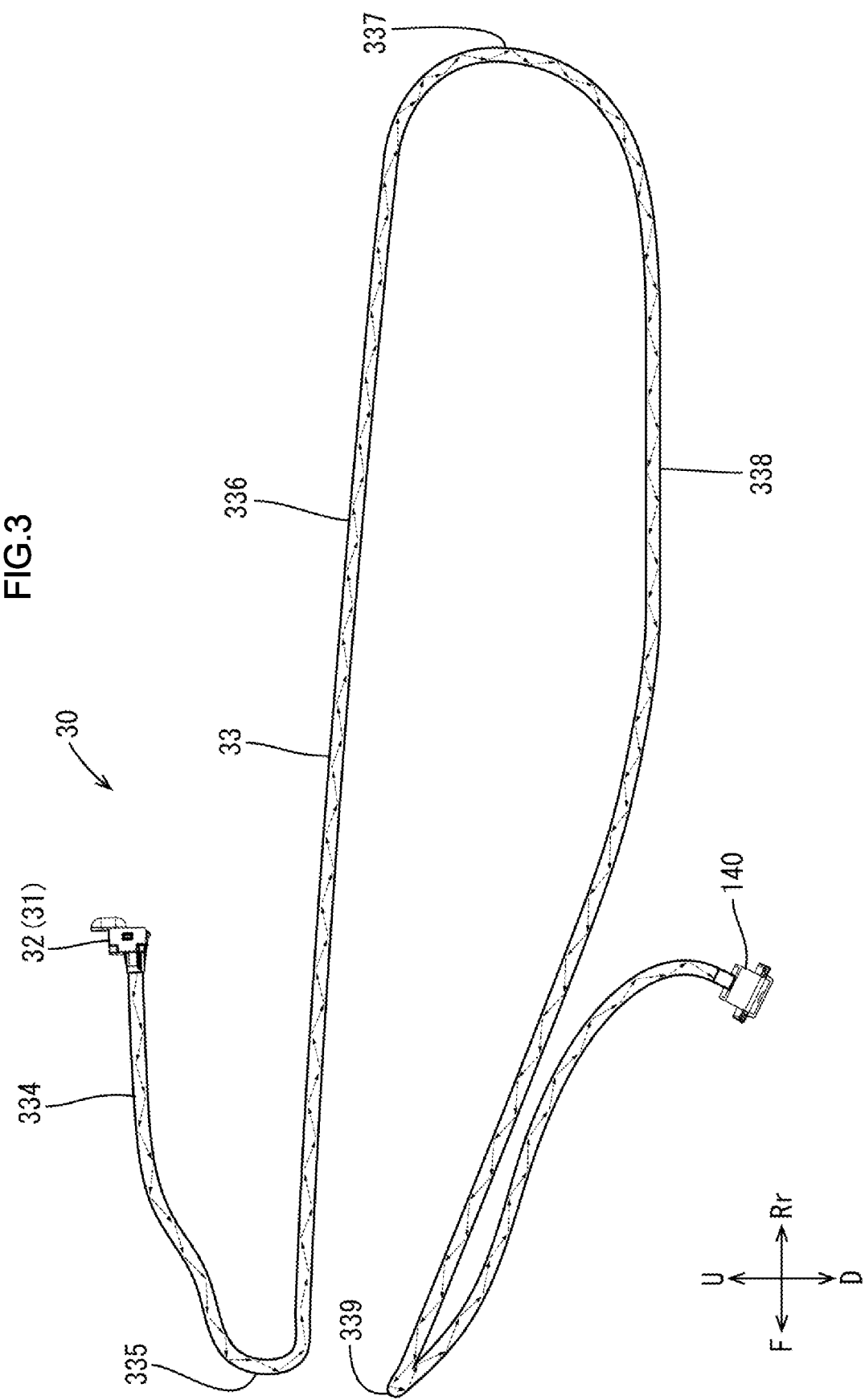
FIG. 3 is an elevation view of a lighting device that is to be mounted on the door trim.

As illustrated in FIG. 3, the lighting device 30 includes a LED 31, which is a light source, and a light guide member 33 within which light emitted by the LED 31 travels. The LED 31 that is mounted on a LED board is arranged in a LED case 32. The LED 31 is connected to a power supply such as a battery installed in a vehicle.

The light guide member 33 has an elongated bar shape having a circular cross-sectional shape and has flexibility. The light guide member 33 is made of light guide material that has a refractive index that is much greater than that of air and is light transmissive. One example of the light guide material is acrylic resin. As illustrated in FIGS. 1 and 2, the light guide member 33 is curved to extend from the door inside handle bezel 3 to the door pocket 5 via the border section of the upper board 12 and the lower board 13, and the front section of the armrest 4. The light guide member 33 is curved in a zig zag manner and arranged on the back surface (the vehicular exterior surface) of the trim board 22. The arrangement route of the light guide member 33 will be described later.

Figure 24:
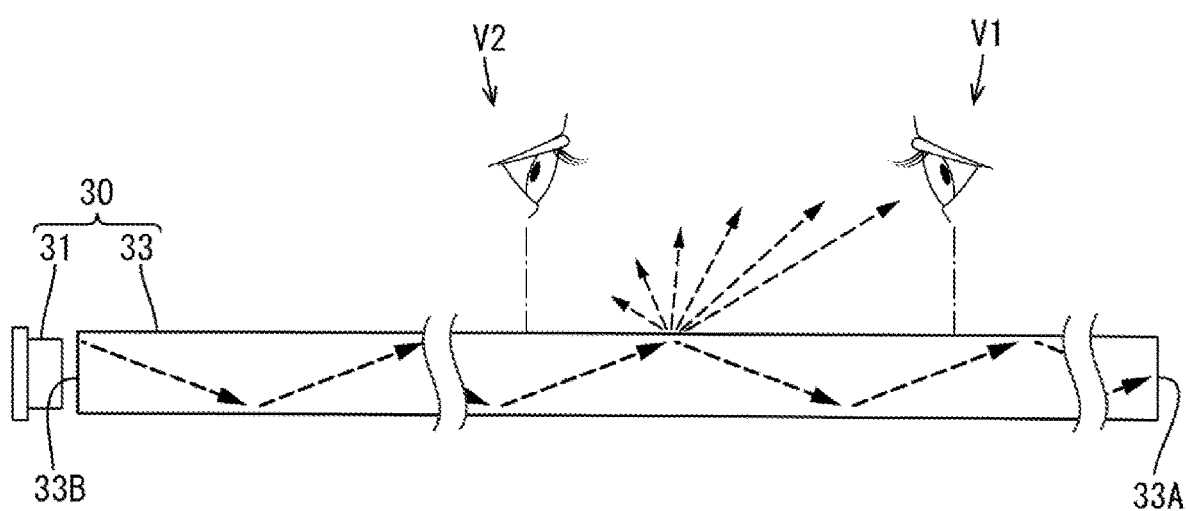
FIG. 24 is a side view illustrating the light guide member in which light travels.

As illustrated in FIG. 24, the light guide member 33 has an end surface 33B at one end portion thereof and the end portion is fixed to the LED case 32 such that the end surface 33B faces the light emission surface of the LED 31. The end surface 33B of the light guide member 33 facing the light emission surface is a light entering surface. The light guide member 33 of this embodiment includes a core including highly light transmissive fibers and a cladding layer that covers a peripheral surface of the core. Light travels through the core. The cladding layer is made of material having a refractive index relatively lower than that of the core. With such a configuration, the light travels within the core in the longitudinal direction while being totally reflected at an interface between the core and the cladding layer. The cladding layer is light transmissive and the core and the cladding layer include diffuser material. Therefore, the light guide member 33 is a side surface light exit type light guide plate and in this type of light guide member, the light exits the peripheral surface of the light guide member 33. The material for the light guide member 33 is not particularly limited. For example, the material for the core may include acrylic resin, polycarbonate, and silicone resin and the material for the cladding layer may include fluorocarbon polymers.

<Mounting of Lighting Device>

The trim board 2 includes lighting holes (one example of a lighting hole) and the light that exits the light guide member 33 exits through the lighting holes toward the vehicular interior side. The lighting holes are through the trim board 2 and extends from the front surface to the back surface of the trim board 2. The trim board 2 includes a long hole (a slit, a through hole) S in the door inside handle bezel 3 (refer to FIG. 5) as one example of the lighting holes, and includes long holes 17, 19 in the border section between the upper board 12 and the lower board 13, and the front section of the armrest 4, respectively. The long holes are independent from each other. The trim board 2 includes a through hole 13H (one example of the through hole) as the lighting hole above the door pocket 5. In the following, a mounting assembly 100 of the door trim 1 and the lighting device 30 (the light guide member 33) will be described. In the mounting assembly 100, the light guide member 33 is fixed to the surrounding section of the door inside handle bezel 3.

Figure 4:
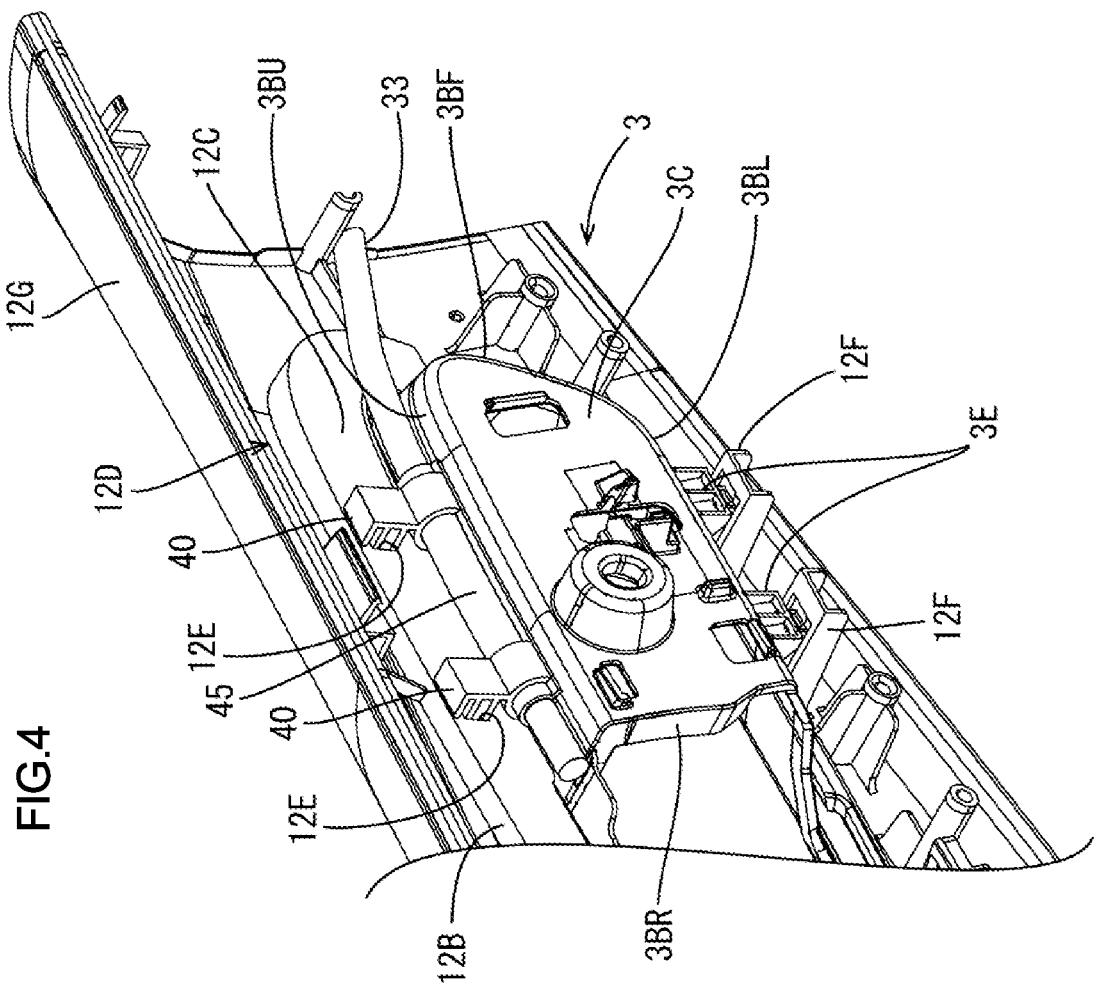
FIG. 4 is a perspective view illustrating a portion of the door trim including a door inside handle bezel seen from a back surface side.
Figure 5:
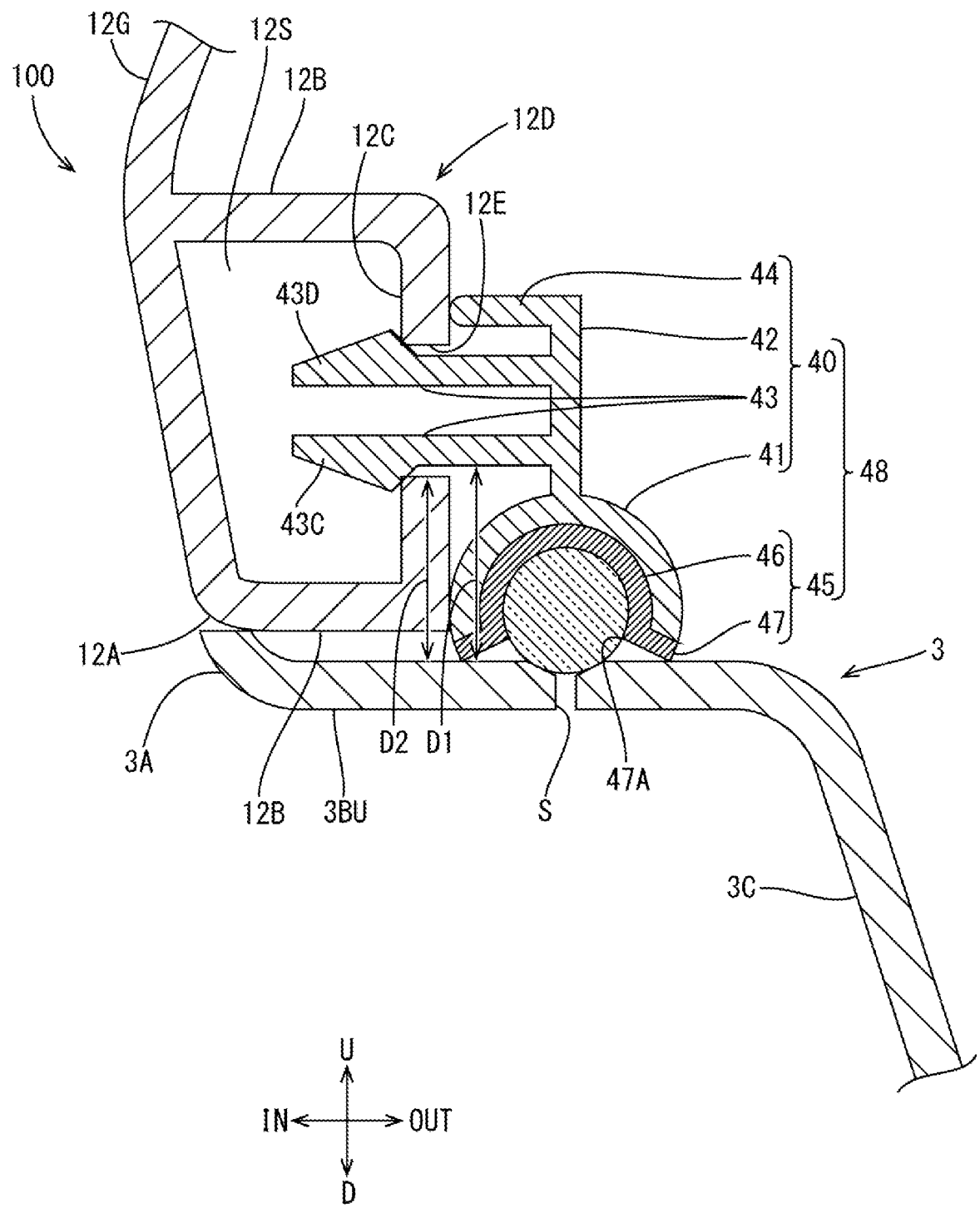
FIG. 5 is a cross-sectional view illustrating a mounting assembly of a light guide member and a door trim according to one embodiment taken along a A-A line in FIG. 2.

Configurations of the door inside handle bezel 3 and the surrounding section thereof will be described. As illustrated in FIGS. 4 and 5, the door inside handle bezel 3 has a box shape and is recessed from the plate surface of a body member 12G of the upper board 12 toward the vehicular exterior side such that an occupant easily holds a holder portion of the door inside handle. The door inside handle bezel 3 includes an interior surface portion 3A, side walls 3BU, 3BL, 3BF, 3BR, and a base wall 3C. As illustrated in FIG. 5, the interior side surface of the interior surface portion 3A is about flush with the interior side surface of the body member 12G of the upper board 12. The interior surface portion 3A extends along a hole edge of the handle hole 12A. The base wall 3C is on the exterior side with respect to the interior surface portion 3A and is about parallel to the body member 12G of the upper board 12. The side walls 3BU, 3BL, 3BF, 3BR continuously extend from the periphery of the base wall 3C to the interior surface portion 3A. The side walls 3BU, 3BL, 3BF, 3BR include an upper side wall 3BU, a lower side wall 3BL, a front side wall 3BF, and a rear side wall 3BR. The side walls 3BU, 3BL, 3BF, 3BR connect the base wall 3C and the interior surface portion 3A. As illustrated in FIG. 5, the upper side wall 3BU that is configured as an upper section of the door inside handle bezel 3 includes the slit S (one example of a long hole, the through hole) that extends in the front-rear direction. The front side wall 3BF and the rear side wall 3BR, which are configured as a front section and a rear section of the door inside handle bezel 3, respectively, include stopper projections projecting frontward and rearward, respectively. As illustrated in FIG. 4, the lower side wall 3BL includes stopper projections 3E projecting downward.

As illustrated in FIGS. 4 and 5, the upper board 12 includes the body member 12G and a receiving member 12D. The receiving member 12D is on the vehicular exterior side surface of the body member 12G and above the handle hole 12A. The receiving member 12D extends in the front-rear direction and includes upper and lower rib walls 12B and a connection wall 12C. The upper and lower rib walls 12B project from the body member 12G of the upper board 12 toward the vehicular exterior side. The lower rib wall 12B projects from the hole edge of the handle hole 12A toward the vehicular exterior side and extends along the hole edge of the handle hole 12A. The connection wall 12C connects the upper and lower rib walls 12B at the projected ends thereof. Thus, the receiving member 12D has a hollow box shape as a whole. As illustrated in FIG. 5, a space 12S is defined in the hollow box shape by the upper and lower rib walls 12B, the connection wall 12C, and the body member 12G.

As illustrated in FIG. 4, the upper board 12 includes receiver portions 12F below the handle hole 12A. The receiver portions 12F project from the exterior side surface of the upper board 12 toward the vehicular exterior side. The stopper projections 3E of the door inside handle bezel 3 are fitted to the respective receiver portions 12F. The rib walls 12B and the connection wall 12C of the receiving member 12D and the receiver portions 12F are made of synthetic resin and integrally included in the upper board 12. The rib walls 12B, the connection wall 12C, and the receiver portions 12F are integrally included in the vicinity of the handle hole 12A.

The door inside handle bezel 3 is fitted into the handle hole 12A of the upper board 12 from the vehicular interior side. Accordingly, the stopper projections 3E of the door inside handle bezel 3 are fitted in the receiver portions 12F, respectively, as illustrated in FIG. 4. Thus, the door inside handle bezel 3 is fixed to the upper board 12. In this configuration, as illustrated in FIG. 5, the connection wall 12C of the upper board 12 is vertical to the upper side wall 3BU and is near the slit S. The connection wall 12C extends in the front-rear direction along the slit S. The connection wall 12C is one example of a wall. The connection wall 12C includes stopper holes 12E in a vehicular front section and a vehicular rear section of the connection wall 12C, respectively, corresponding to a vehicular front section and a vehicular rear section of the slit S. The stopper holes 12E are through holes and clips 40 (a light guide member holder) are inserted in the respective stopper holes 12E.

<Mounting Assembly>

The mounting assembly 100 will be described more in detail. The mounting assembly 100 includes the light guide member 33, the trim board 2, and a light guide member mounting member 48. The light guide member mounting member 48 will be described with reference to FIGS. 5 to 7. The light guide member 33 is mounted on a back surface of the door trim 1 along the slit S with the light guide member mounting member 48.

Figure 6:
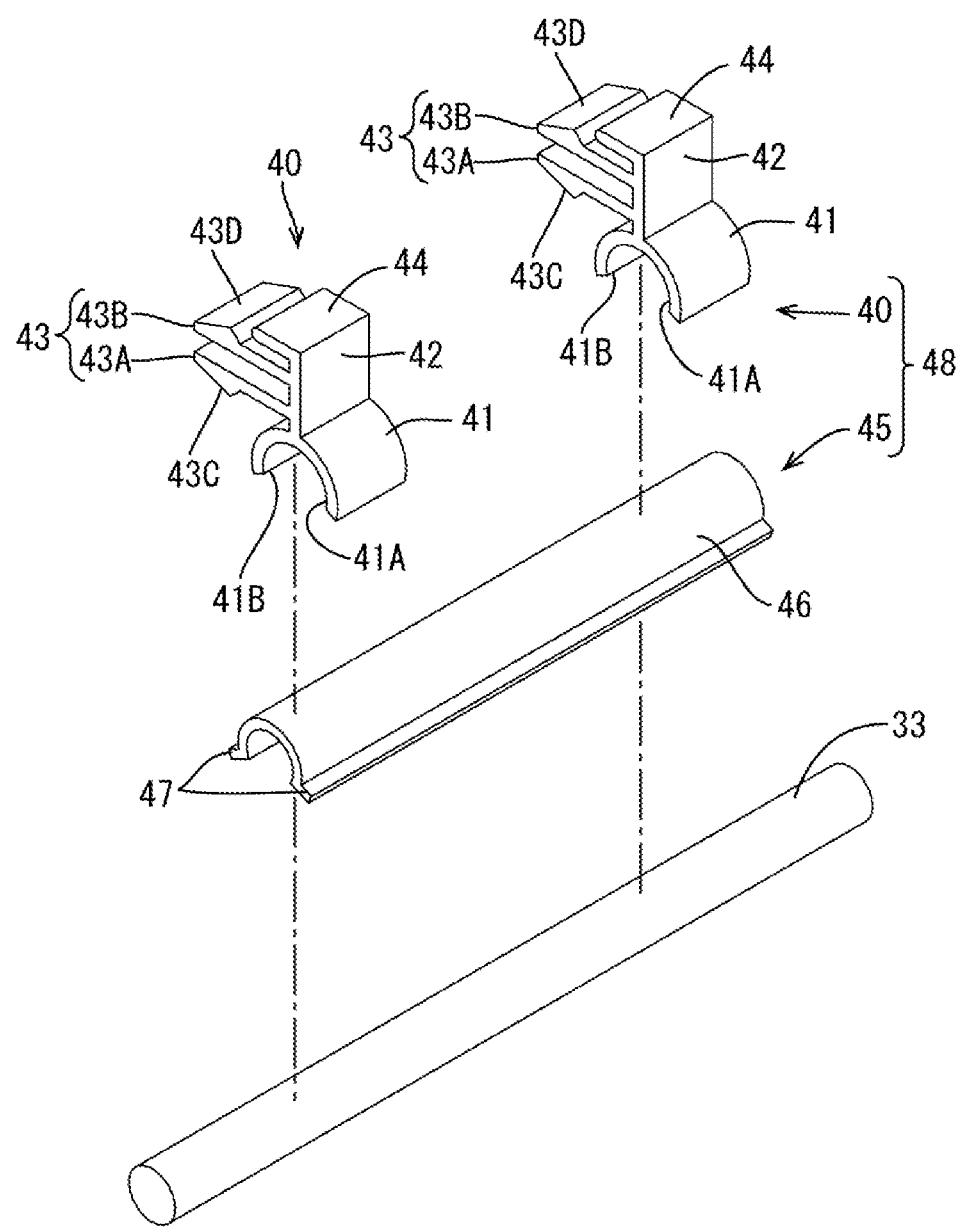
FIG. 6 is an exploded perspective view illustrating a clip, an elastic member, and a light guide member in the mounting assembly illustrated in FIG. 5.
Figure 7:
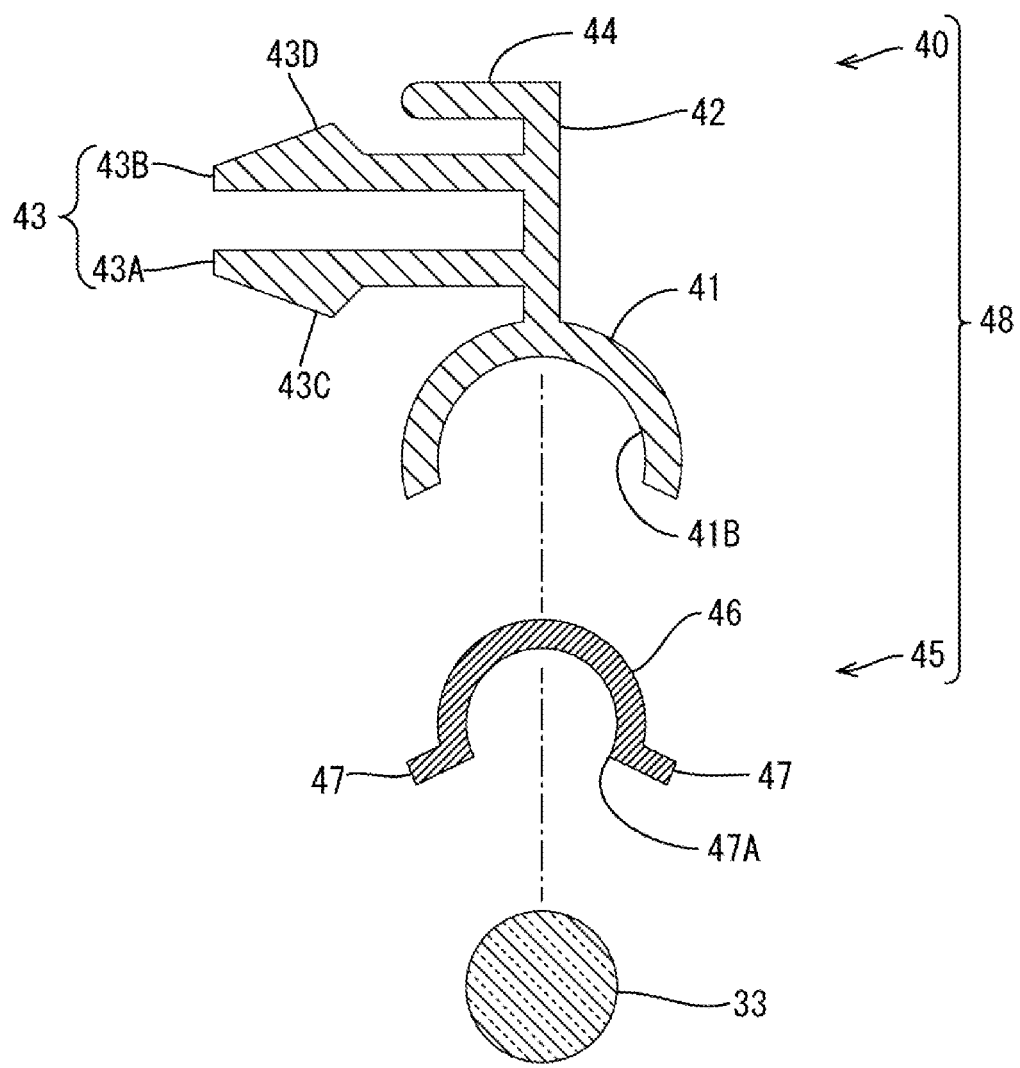
FIG. 7 is an exploded cross-sectional view illustrating the clip, the elastic member, and the light guide member in the mounting assembly illustrated in FIG. 5.

The light guide member mounting member 48 includes the clips 40 (a light guide member holder) and an elastic member 45 (an intermediate member). As illustrated in FIGS. 4 and 5, the elastic member 45 is a long member having a tubular shape having a C-shaped cross section. The elastic member 45 extends along the light guide member 33 and covers a portion of a peripheral surface of the light guide member 33. More specifically, as illustrated in FIGS. 5 to 7, the elastic member 45 includes an arched portion 46 and edge portions 47. The arched portion 46 is curved along the peripheral surface of the light guide member 33 and has a curvature so as to be along the peripheral surface of the light guide member 33. The edge portions 47 extend from two long edges of the arched portion 46, respectively, outward in the radial direction of the arched portion 46.

The elastic member 45 is longer than the slit S. Namely, the elastic member 45 has a long dimension that extends in an axial direction thereof and the long dimension of the elastic member 45 is greater than a long dimension of the slit S. The arched portion 46 of the elastic member 45 has a curvature that is slightly smaller than a curvature of the peripheral surface of the light guide member 33. With such a configuration, when the light guide member 33 is fitted in the elastic member 45, the arched portion 46 of the elastic member 45 is deformed such that the curvature of the arched portion 46 is increased to cover a portion of the entire peripheral surface of the light guide member 33. The covered portion of the peripheral surface of the light guide member 33 has an area that is greater than a half of the area of the entire peripheral surface in the circumferential direction of the light guide member 33. The coverage area of the covered portion is defined by a central angle that is greater than 180 degrees, which is about 225 degrees in this embodiment. The portion of the light guide member 33 that is covered with the elastic member 45 is a portion of the light guide member 33 with respect to the longitudinal direction and the circumferential direction of the light guide member 33.

The elastic member 45 is made of elastic material that is elastically deformable and is made of synthetic resin (including elastomer and rubber), for example. The elastic member 45 is molded with extrusion. The elastic member 45 may have color of high light blocking properties (including light reflective properties) with respect to the light emitted by the LED 31. Examples of such colors may include black, white, gray, and metallic color. In such a configuration, the elastic member 45 may be configured as a light blocking cover covering the light guide member 33.

The clip 40 is for pressing the light guide member 33 to the hole edge of the slit S of the upper side wall 3BU of the door inside handle bezel 3. The clip 40 includes a cover portion 41 (a support portion, a cover portion, a curved wall), a connection portion 42, a fitting portion 43, and a contact portion 44. The cover portion 41 covers a portion of the light guide member 33 that is opposite side from a portion of the light guide member 33 facing the slit S. The cover portion 41 extends in the longitudinal direction and the circumferential direction of the light guide member 33. The cover portion 41 covers the light guide member 33 via the elastic member 45. As illustrated in FIGS. 6 and 7, the cover portion 41 has a tubular shape having a C-shaped cross section and has a space 41A therein and an opening 41B. The cover portion 41 has an arched surface having a curvature that is along the inner peripheral surface of the elastic member 45 that covers the light guide member 33. The cover portion 41 has an axial dimension extending in the longitudinal direction of the elastic member 45. The axial dimension of the cover portion 41 is much smaller than the long dimension of the slit S that is along the axial dimension of the elastic member 45.

The connection portion 42 is a plate member that connects the contact portion 44, the fitting portion 43, and the cover portion 41. The connection portion 42 extends upward from a middle of the cover portion 41 with respect to the circumferential direction. The connection portion 42 is a plate member extending from an outer circumferential surface of the cover portion 41. The connection portion 42 has a plate surface that is along the axial direction of the cover portion 41 and along the axial direction of the light guide member 33. The connection portion 42 extends from the cover portion 41 outward in the radial direction. The contact portion 44 extends from an extended end of the cover portion 41 in a direction crossing the plate surface of the connection portion 42. The contact portion 44 extends toward the upper board 12.

The fitting portion 43 extends from the connection portion 42 in the direction crossing the plate surface of the connection portion 42. The fitting portion 43 is between the contact portion 44 and the cover portion 41. The fitting portion 43 includes two plate pieces 43A, 43B that are parallel to and spaced away from each other. The plate pieces 43A, 43B have opposing surfaces that are opposite each other while having a space therebetween. The plate pieces 43A, 43B extend from the connection portion 42 to be vertical to the plate surface of the connection portion 42. The plate pieces 43A, 43B include stopper projections 43C, 43D at extended ends thereof, respectively. The stopper projections 43C, 43D project from surfaces of the plate pieces 43A, 43B that are opposite from the opposing surfaces. Each of the stopper projections 43C, 43D has a triangular cross-sectional shape. At least the fitting portion 43 of the clip 40 is elastically deformable and may be molded by extruding synthetic resin (including elastomer and rubber).

The cover portion 41 of the clip 40 has a curvature that is slightly smaller than a curvature of the peripheral surface of the elastic member 45 that covers the light guide member 33. With such a configuration, when the light guide member 33 is fitted in the elastic member 45 that is covered with the cover portion 41, the cover portion 41 is deformed such that the curvature of the cover portion 41 is increased to cover the outer peripheral surface of the elastic member 45 and the portion of the peripheral surface of the light guide member 33. The covered portion of the peripheral surface of the light guide member 33 has an area that is greater than a half of the area of the entire peripheral surface in the circumferential direction of the light guide member 33. The entire outer peripheral surface of the elastic member 45 is covered with the cover portion 41. The coverage area of each of the covered portions of the light guide member 33 and the elastic member 45 is defined by a central angle that is greater than 180 degrees.

The circumferential dimension of the inner peripheral surface of the cover portion 41 is about same as or slightly smaller than the circumferential dimension of the outer peripheral surface of the arched portion 46. The thickness of the cover portion 41 is about same as the projection dimension of the outer peripheral surface of the edge portion 47. According to such a configuration, as illustrated in FIG. 5, the elastic member 45 is fitted in the space 41A of the cover portion 41 through the opening 41B such that the circumferential ends of the cover portion 41 are contacted with the respective edge portions 47.

The mounting of the light guide member 33 on a back surface side of the door inside handle bezel 3 will be described. The elastic member 45 is disposed on the light guide member 33 to cover the portion of the light guide member 33. A lower portion of the light guide member 33 is an uncovered portion that is exposed outside through the opening 47A between the edge portions 47. The uncovered portion of the light guide member 33 is contacted with the hole edges of the slit S of the upper side wall 3BU.

The position of the elastic member 45 in the longitudinal direction is adjusted such that the elastic member 45 entirely covers the slit S in the longitudinal direction from the above. The cover portions 41 of the clips 40 are disposed on the elastic member 45 near the respective stopper holes 12E of the upper board 12 and the distal ends of the fitting portions 43 of the clips 40 are inserted in the respective stopper holes 12E. The elastic member 45 is covered with the cover portion 41 from the radial direction. As illustrated in FIG. 5, the clips 40 are inserted in the respective stopper holes 12E such that the stopper projections 43C, 43D are disposed in the space 12S and the stopper projections 43C, 43D are stopped by the hole edges of the stopper holes 12E. Accordingly, the clips 40 are fixed to the upper board 12 while the light guide member 33 is contacted with the hole edge of the slit S of the upper side wall 3BU.

Furthermore, as illustrated in FIG. 5, the edge portions 47 of the elastic member 45 are contacted with the upper side wall 3BU. According to such a configuration, the light emitted by the LED 31 of the lighting device 30 exits through the peripheral surface of the light guide member 33 and further exits through the slit S to the vehicular interior space. The portion of the light guide member 33 that is above the slit S is covered with the light guide member mounting member 48 such that no gap is between the light guide member mounting member 48 and the door inside handle bezel 3. According to such a configuration, the light exiting the light guide member 33 is less likely to leak through any other portions than the slit S.

The light guide member mounting member 48 is designed such that the clip 40 that is fixed to the upper board 12 presses the light guide member 33 to the upper side wall 3BU. Specifically, as illustrated in FIG. 5, the distance D1 between the lower surface of the fitting portion 43 and the upper surface of the upper side wall 3BU is greater than or equal to the distance D2 between the lower edge hole of the stopper hole 12E and the upper surface of the upper side wall 3BU. According to such a configuration, the light guide member 33 is less likely to be away from the hole edge of the slit S or from the upper side wall 3BU. If the light guide member 33 is away from the hole edge of the slit S, a gap may be created between the light guide member 33 and the hole edge of the slit S and the light that exits the light guide member 33 may leak through the gap. In this embodiment, such a gap is less likely to be created and this suppresses unevenness in the amount of light rays exiting trough the slit S. The door trim 1 is supplied with light rays of uniform brightness seen from the vehicular interior side. In this embodiment, the light guide member 33 is fixed to the door inside handle bezel 3 by two clips 40 at two positions.

<Light Blocking Cover>

Figure 2:
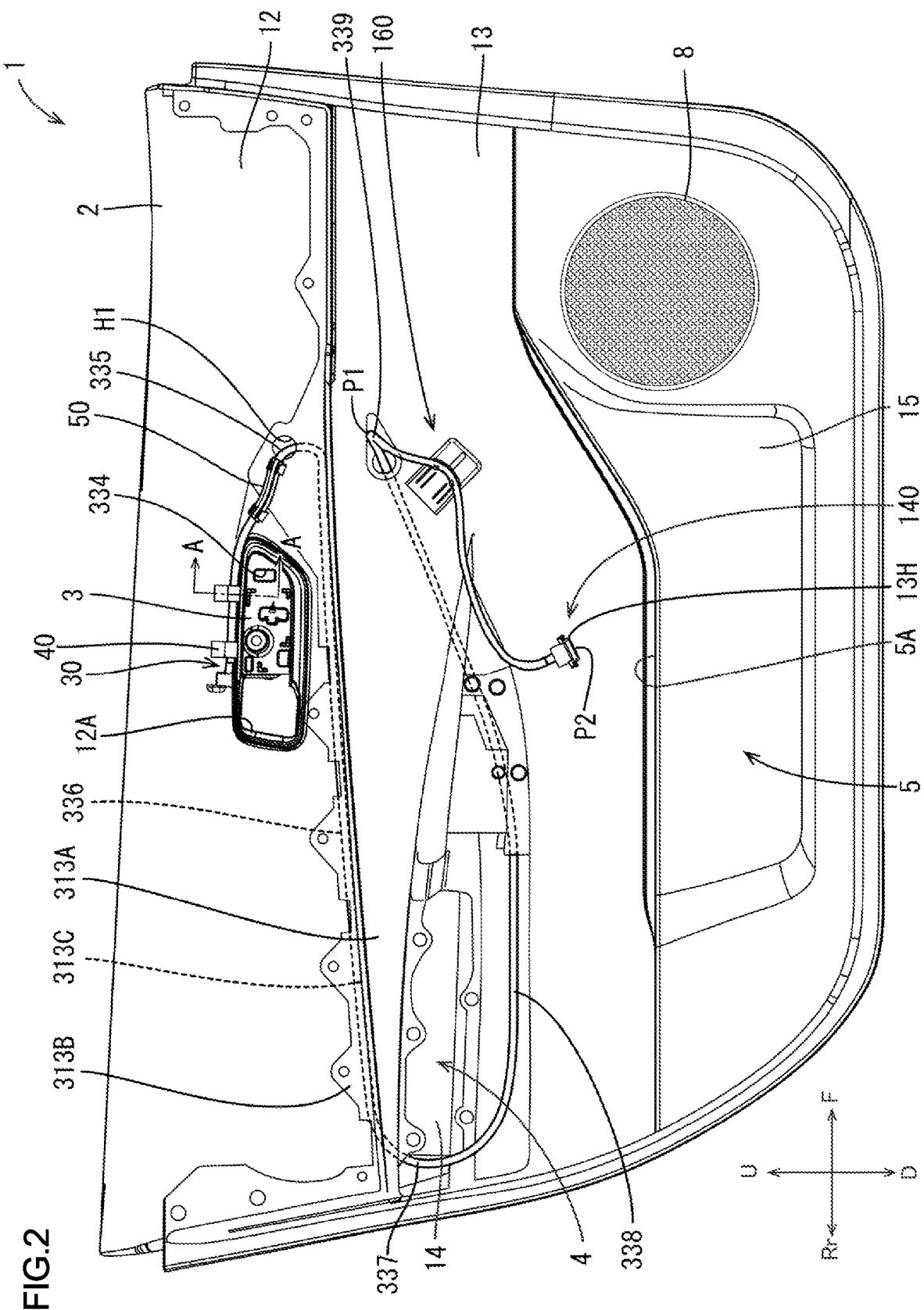
FIG. 2 is a back surface side view illustrating the door trim.
Figure 8:
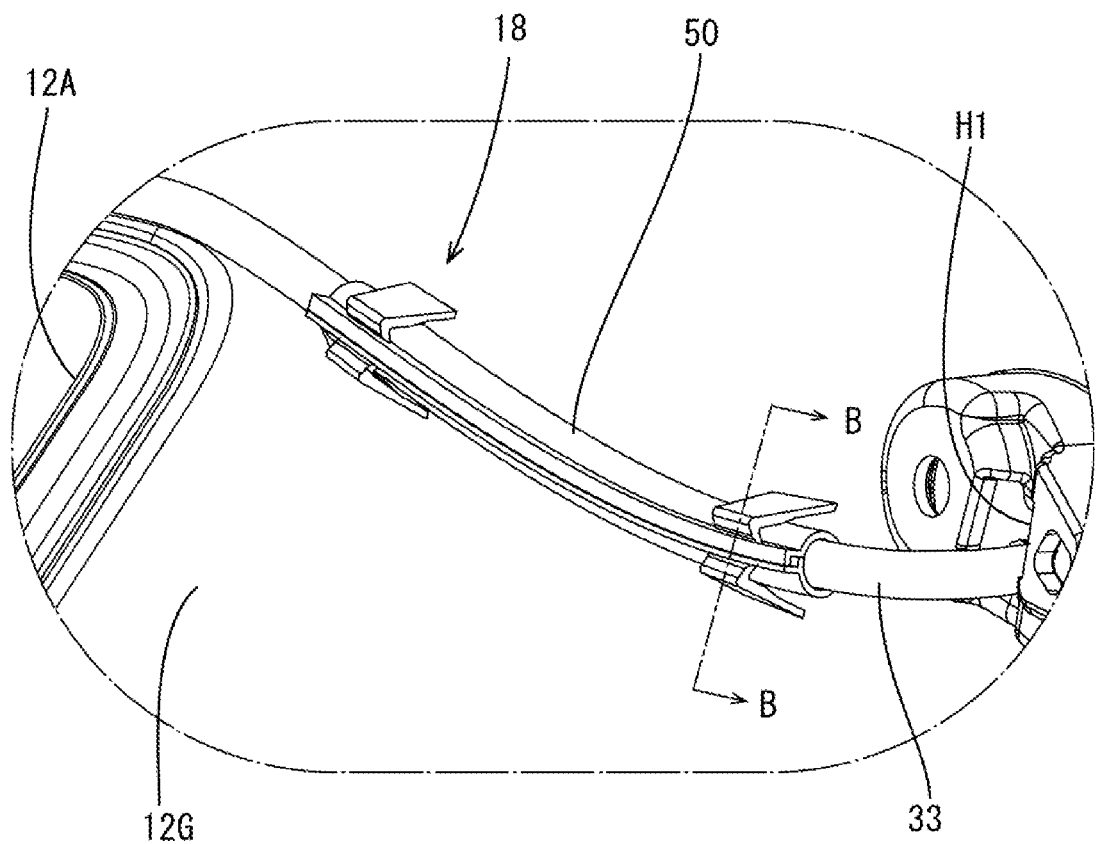
FIG. 8 is a perspective view illustrating a mounting assembly of the light guide member and the door trim according to another embodiment.

As illustrated in FIGS. 1 and 2, the light guide member 33 is curved to extend from the door inside handle bezel 3 to the door pocket 5 via the border section of the upper board 12 and the lower board 13, and the front section of the armrest 4. The long light guide member 33 is arranged to supply light to several portions of the door trim. In such a configuration, it is not desirable that light rays exiting the light guide member 33 leaks from an undesired portion of the door trim 1 to the vehicular interior side. The door trim 1 may have a possible portion through which the light from the light guide member 33 leaks to the vehicular interior side. As illustrated in FIGS. 2 and 8, a portion of the light guide member 33 that is disposed near the possible portion of the door trim 1 is covered with a light blocking cover 50. The light guide member 33 is fixed to the vehicular exterior side surface of the trim board 2 while being covered with the light blocking cover 50.

Figure 9:
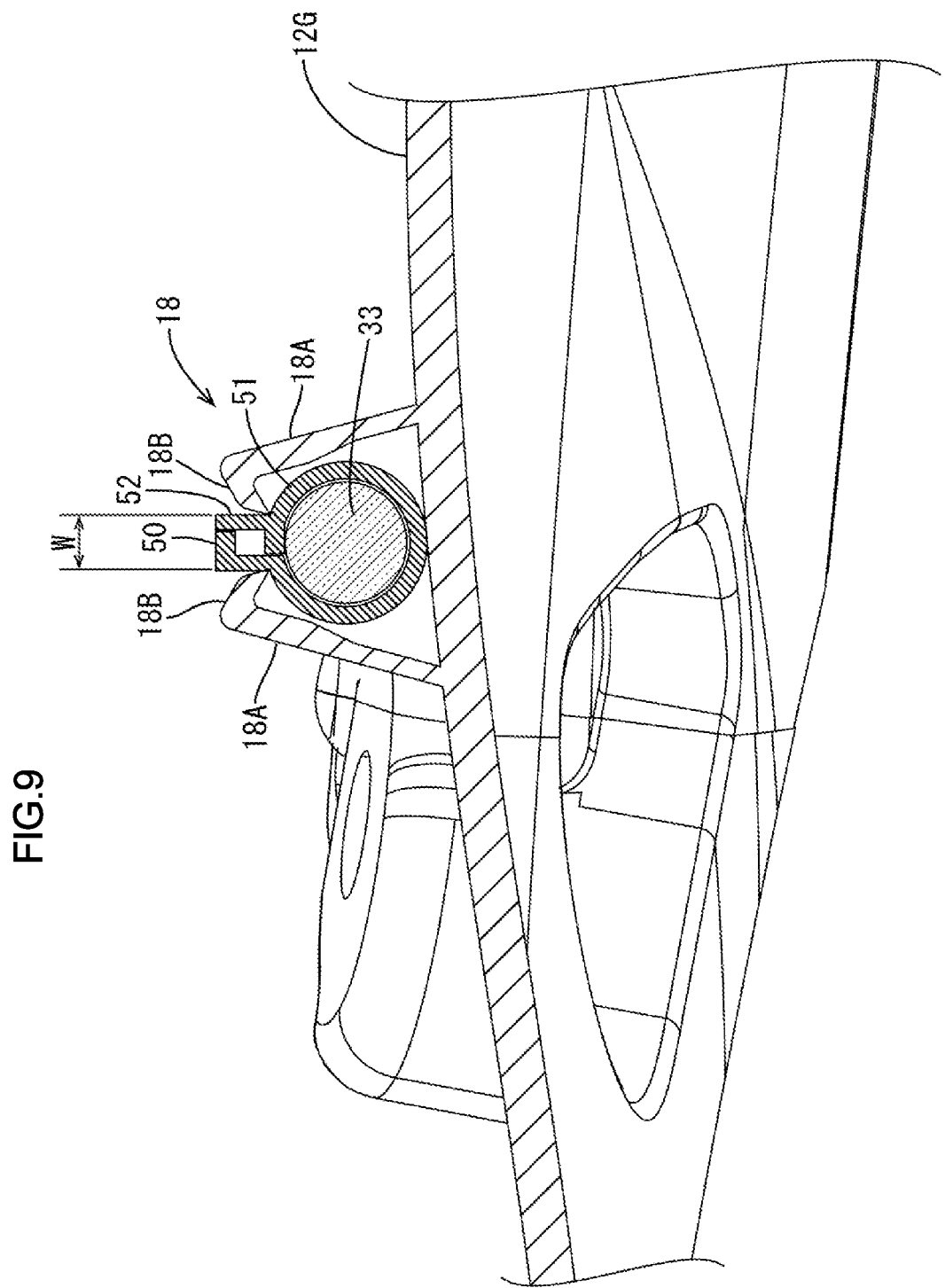
FIG. 9 is a cross-sectional view of a holding member and a light blocking cover that covers the light guide member taken along a B-B line in FIG. 8.
Figure 10:
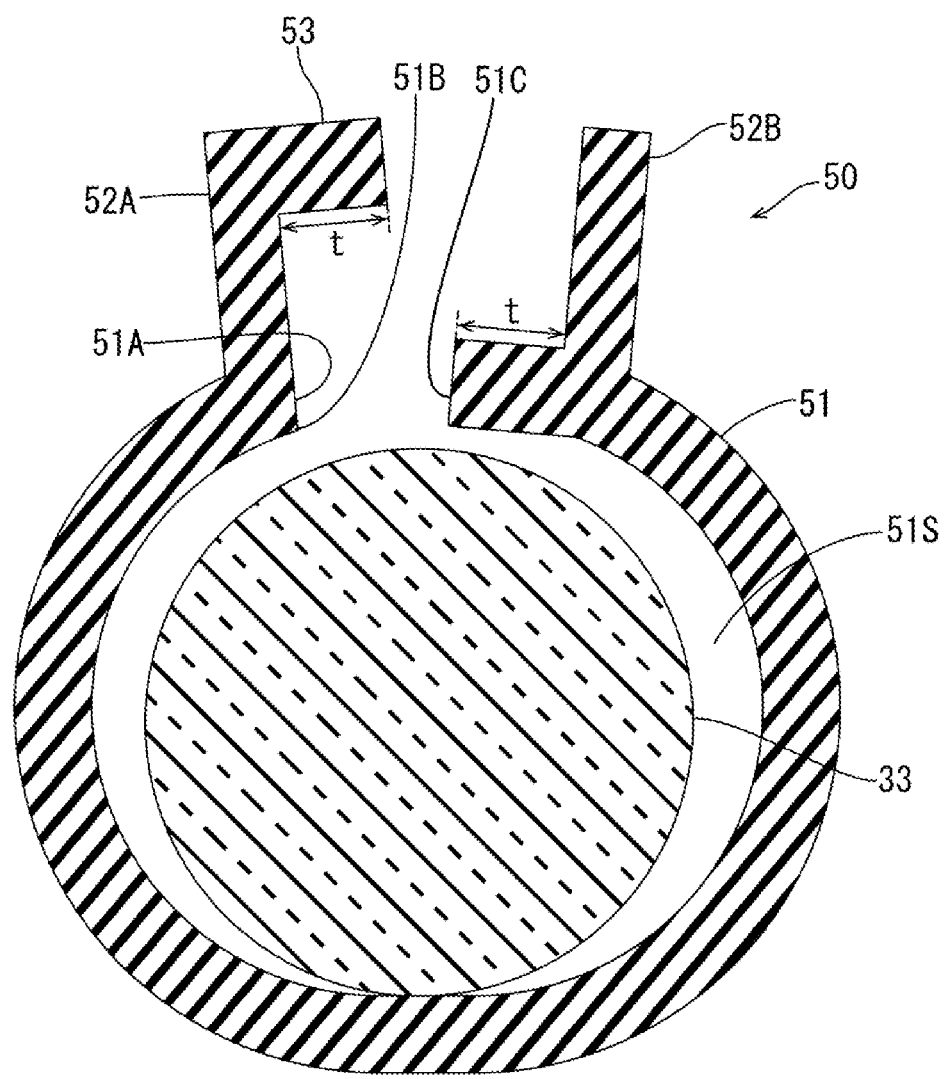
FIG. 10 is a cross-sectional view of the light guide member and the light blocking cover that covers the light guide member and is opened.

The light blocking cover 50 is made of synthetic resin (including elastomer and rubber) having flexibility. As illustrated in FIGS. 9 and 10, the light blocking cover 50 includes a body portion 51 and a flange portion 52. The flange portion 52 includes a first flange portion 52A and a second flange portion 52B. The body portion 51 has a tubular shape having a long slit 51A (a separation portion) that extends in an axial direction of the tubular shape. The body portion 51 has two long edges 51B, 51C at the long slit 51A. In a normal state illustrated in FIG. 9, the two long edges 51B, 51C of the body portion 51 are very close to each other or contacted with each other. An entire circumferential surface of a portion of the light guide member 33 is covered with the body portion 51.

As illustrated in FIG. 10, the first flange portion 52A and the second flange portion 52B project outward in the radial direction from long edge portions of the body portion 51, respectively. The first flange portion 52A and the second flange portion 52B extend along the slit 51A while having the slit 51A therebetween. The two flange portions 52A, 52B are spaced away from each other in the circumferential direction of the body portion 51 by a dimension t. As illustrated in FIG. 10, the first flange portion 52A projects from the first long edge 51B and the second flange portion 52B projects from a portion of the body portion 51 that is away from the second long edge 51C by the dimension t. The light blocking cover 50 further includes an extending portion 53 extending from a projected end of the first flange portion 52A toward the second flange portion 52B by the dimension t.

The light blocking cover 50 is made of material having flexibility. Therefore, the light blocking cover 50 can be opened at the slit 51A such that the first long edge 51B and the second long edge 51C are away from each other and the first flange portion 52A and the second flange portion 52B are away from each other when the light guide member 33 is put in the light blocking cover 50. However, when the light guide member 33 is put in and covered with the light blocking cover 50 in the normal state as illustrated in FIG. 9, the body portion 51 restores its original shape, which is the tubular shape, and an extended end of the extending portion 53 is contacted with the second flange portion 52B and the first long edge 51B and the second long edge 51C are contacted with each other. The dimension t of the extending portion 53 is equal to the dimension t of the long edge portion including the second long edge 51C. Therefore, when the light blocking cover 50 is in the normal state, the extended end of the extending portion 53 is contacted with the second flange portion 52B and the first long edge 51B and the second long edge 51C are contacted with each other and the slit 51A is closed. Thus, an inner space 51S of the body portion 51 is closed and the light from the light guide member 33 is less likely to leak through the slit 51A and a portion between the extending portion 53 and an extended end portion of the second flange portion 52B. In the normal state as illustrated in FIG. 9, the flange portion 52 has a width W that is a total of the dimension t, a thickness of the first flange portion 52A, and a thickness of the second flange portion 52B.

According to such a configuration, the first flange portion 52A and the second flange portion 52B are moved away from each other to open the slit 51A and the light guide member 33 can be inserted in the space 51S of the body portion 51 through the opened slit 51A easily. Thus, the light guide member 33 can be easily put in the tubular light blocking cover 50 and the light is less likely to leak through the slit 51A. The light blocking cover 50 is molded with extruding. The longitudinal dimension of the light blocking cover 50 can be adjusted to a length dimension of a desired portion of the light guide member 33 for blocking the light.

As illustrated in FIG. 9, the trim board 2 includes holding members 18 projecting from the vehicular exterior side surface of the body member 12G. The holding members 18 are near the handle hole 12A and a hole H1 in the body member 12G. The holding members 18 are for holding the light blocking cover 50. Each of the holding members 18 includes wall portions 18A and stopper portions 18B. The wall portions 18A extend from the vehicular exterior side surface of the body member 12G and are opposite each other. The stopper portions 18B extend from extended ends of the wall portions 18A, respectively, to be closer to each other.

The wall portions 18A are away from each other and a distance between basal portions of the wall portions 18A is greater than an outer diameter of the body portion 51 of the light blocking cover 50. The basal portions are joint portions of the wall portions 18A that are continuous to the trim board 2. The wall portions 18A are inclined such that the distance between the wall portions 18A decreases as they extend toward the stopper portions 18B. The stopper portions 18B are angled with respect to the respective wall portions 18A such that the stopper portion 18B and the wall portion 18A form an acute angle. The stopper portions 18B have a length such that extended ends of the respective stopper portions 18B are away from each other. As illustrated in FIG. 9, a distance between the extended ends of the respective stopper portions 18B is equal to or slightly greater than the width W of the flange portion 52. The holding members 18 are made of synthetic resin such as polyethylene and polypropylene and are integrally molded with the trim board 2 with injection molding. Each of the holding members 18 is elastically deformable. Specifically, the opposing wall portions 18A are elastically movable to be farther away from each other such that the opposing stopper portions 18B are farther away from each other.

The mounting of the light guide member 33 on a back surface side of the trim board 2 will be described. The first flange portion 52A and the second flange portion 52B are separated from each other to enlarge the slit 51A and open the light blocking cover 50. The light guide member 33 is put in the space 51S of the body portion 51 through the enlarged slit 51A. Then, the first flange portion 52A and the second flange portion 52B are released and restore their original shapes and the slit 51A is closed. The body portion 51 restores its original tubular shape and the first long edge 51B and the second long edge 51C are contacted with each other.

Thus, the light blocking cover 50 becomes in the normal state and the entire peripheral surface of the portion of the light guide member 33 is covered with the light blocking cover 50. Furthermore, when the light blocking cover 50 is in the normal state, the extending portion 53 is contacted with the extended end portion of the second flange portion 52B on an outer side with respect to the body portion 51 in the radial direction. Thus, in the normal state, a space within the flange portion 52 is closed on an outer side with respect to the slit 51A in the radial direction. Therefore, even if the light from the light guide member 33 leaks through the slit 51A to the space within the flange portion 52, the light leaking through the slit 51A does not exit outside the flange portion 52.

The light guide member 33 that is covered with the light blocking cover 50 is inserted in a space between the opposing stopper portions 18B of each holding member 18 from the body portion 51 side and pushed further into the space. This enlarges the distance between the opposing stopper portions 18B and the light guide member 33 covered with the light blocking cover 50 is inserted in a space between the opposing wall portions 18A of each holding member 18. In this state, as illustrated in FIG. 9, the first flange portion 52A and the second flange portion 52B are between the opposing stopper portions 18B and the stopper portions 18B are contacted with basal portions of the first flange portion 52A and the second flange portion 52B, respectively. This suppresses the light guide member 33 that is covered with the light blocking cover 50 from moving away from the back surface (the vehicular exterior side surface) of the trim board 2.

In the mounting assembly 100 of the door trim 1 and the lighting device 30 (the light guide member 33), the lighting device 30 includes the LED 31 and the long light guide member 33 within which light emitted by the LED 31 travels. The door trim 1 (the trim board 2) is a plate member and includes the door inside handle bezel 3. The door inside handle bezel 3 includes the long slit S that is through the upper side wall 3BU. The upper board 12 of the trim board 2 includes the receiving member 12D that includes the connection wall 12C near the slit S. The light guide member 33 is mounted on the back surface side (the vehicular exterior side) of the upper side wall 3BU along the slit S with the clips 40 that are fitted to the connection wall 12C. According to such a configuration, the light emitted by the LED 31 and traveling within the light guide member 33 exits the light guide member 33 and through the slit S to the vehicular interior side of the door trim 1. The clip 40 includes the connection portion 42, the fitting portion 43, and the cover portion 41. The fitting portion 43 extends from the connection portion 42 toward the vehicular interior side when the clip 40 is fitted to the connection wall 12C. The cover portion 41 covers the light guide member 33 from an opposite side from the slit S with respect to the light guide member 33. The connection portion 42 connects the cover portion 41 and the fitting portion 43. When the fitting portion 43 is inserted in the stopper hole 12E, the light guide member 33 is contacted with the hole edge of the slit S.

According to the above configuration, the light guide member 33 is mounted on the back surface side of the door trim 1 with the clips 40 and the cover portions 41 of the respective clips 40 are fitted to the light guide member 33 such that the light guide member 33 is contacted with the hole edge of the slit S. According to such a configuration, the clips 40 that support the light guide member 33 are fitted to the connection wall 12C of the upper board 12 and the light guide member 33 can be positioned appropriately, stably, and easily with respect to the slit S. Thus, the light guide member 33 can be mounted on the door trim 1 easily. Furthermore, the cover portion 41 covers and presses the light guide member 33 toward the slit S.

There has been a configuration that includes a mounting member integrally with the light guide member without including a fixing member to reduce cost. However, in such a configuration, the light guide member needs to be curved and routed in multiple portions of the interior component to supply light that is emitted by one single light source and guided within the long light guide member to the multiple portions.

The long light guide member integrally including the mounting member is increased in strength in one direction and is less likely to be curved effectively. The long light guide member integrally including the mounting member may be likely to be moved away from the interior component. If the light guide member is directly mounted on the lighting hole without having a transparent lens member therebetween and the light guide member has a portion that is moved away from the interior component, the amount of light that exits the portion of the light guide member moved away from the interior component through the lighting hole to the vehicular interior side is reduced. This likely causes unevenness in the amount of light rays supplied to the vehicular interior side.

However, in this embodiment, the light guide member 33 is less likely to move away from the door trim 1 or the slit S. This suppresses unevenness in the amount of light rays exiting trough the slit S into the vehicular interior side.

In this embodiment, at least the fitting portion 43 of the clip 40 is made of elastic material and elastically deformable. The cover portion 41 that supports the light guide member 33 is disposed above the slit S when the fitting portions 43 are inserted in the respective stopper holes 12E. Since the fitting portion 43 of the clip 40 is elastically deformable, the fitting portion 43 is inserted in the stopper hole 12E while being elastically deformed and the cover portion 41 pressing the light guide member 33 to the hole edge of the slit S. Thus, the light guide member 33 is mounted on the back surface side of the upper side wall 3BU while being surely contacted with the hole edge of the slit S. According to such a configuration, the position of the light guide member 33 is fixed stably and the light guide member 33 is less likely to move with respect to the slit S even if the vehicle is vibrated according to the vehicle's running Therefore, the amount of light rays that exit the lighting device 30 and are supplied to the vehicular interior side of the door trim 1 can be stably maintained. Furthermore, since the fitting portion 43 can be elastically deformed, the clip 40 that supports the light guide member 33 can be easily fixed to the door trim 1 and this improves mounting operability.

In this embodiment, since the clip 40 is a molded component molded with extruding synthetic resin, the clip 40 having a complicated shape can be produced easily and at low cost. Furthermore, the clip 40 that is made of synthetic resin and has appropriate elasticity is elastically deformed and easily mounted in the door trim 1.

In this embodiment, as illustrated in FIGS. 5 and 7, the elastic member 45 that is elastically deformable is between the cover portion 41 and the light guide member 33. When the fitting portion 43 of the clip 40 is fitted in the stopper hole 12E, the clip 40 presses the light guide member 33 toward the hole edge of the slit S while the elastic member 45 being pressed and elastically deformed between the clip 40 and the light guide member 33. Thus, the light guide member 33 can be mounted on the vehicular exterior side surface of the door trim 1 while receiving resilience. According to such a configuration, the light guide member 33 is less likely to be moved away from the slit S due to the vehicle's vibration. Since the clip 40 supports the light guide member 33 via the elastic deformable elastic member 45, variations in the dimension and the position of each clip 40 and the light guide member 33 can be absorbed by the deformation of the elastic member 45. Accordingly, the light guide member 33 can be mounted on the door trim 1 more stably.

In this embodiment, as illustrated in FIGS. 1 and 2, the trim board 2 includes the upper board 12, the lower board 13, the armrest board 14, and the pocket board 15. In such a configuration, a small gap may be created in a joint portion between the boards or in the portions of the boards having fixing through holes. Normally, such a small gap is designed not to be recognized. However, the light that exits radially through the entire peripheral surface of the light guide member 33 on the back surface side of the trim board 2 may unintentionally leak through the small gap in the trim board 2. This may make the joint portion to be outstanding as an erroneous portion or may deteriorate optical design of the door trim 1 as a whole.

In this embodiment, the elastic member 45 has light blocking properties and blocks light emitted by the LED 31. The portion of the peripheral surface of the light guide member 33 that is covered with the elastic member 45 is greater than a half of the entire peripheral surface in the circumferential direction of the light guide member 33. Therefore, the light that exits through the covered portion of the peripheral surface of the light guide member 33 is blocked by the elastic member 45 on the opposite side from the slit S with respect to the light guide member 33. Thus, the light that exits the light guide member 33 is less likely to be discharged outside the elastic member 45 on the opposite side from the slit S with respect to the light guide member 33. The light is discharged through only the desired portion such as the slit S in the door trim 1. Thus, the door trim 1 having high quality can be achieved.

In this embodiment, the elastic member 45 is longer than the slit S. The elastic member 45 extends along the longitudinal direction of the light guide member 33 and covers a portion of the light guide member 33 in the circumferential direction. The light guide member 33 is fixed to the door trim 1 with two or more clips 40 while having the elastic member 45 therebetween. The clips 40 are spaced away from each other in the longitudinal direction of the elastic member 45. According to such a configuration, the light guide member 33 is mounted on the door trim 1 such that the elastic member 45 blocks the light from exiting the light guide member 33 in an unintentional direction.

Furthermore, as illustrated in FIG. 4, the light guide member 33 is fixed to the door trim 1 with the clips 40 that are spaced away from each other in the longitudinal direction of the light guide member 33. According to such a configuration, when the light guide member 33 is mounted on the door trim 1, the light guide member 33 and the elastic member 45 that is disposed on the light guide member 33 are supported by a hand and arranged in a predefined mounting position and the light guide member 33 and the elastic member 45 that are arranged in the predefined mounting position are fixed to the door trim 1 with the clips 40 at the two end portions of the elastic member 45. Furthermore, since the light guide member 33, which is long, is supported by the elastic member 45, the light guide member 33 is easily arranged along the slit S without causing warping. This achieves a mounting assembly of the lighting device and the vehicular interior component having good mounting operability.

In this embodiment, the connection wall 12C (the wall portion, the vehicular interior component) of the upper board 12 includes the stopper holes 12E and the fitting portion 43 that extends from the connection portion 42 includes the stopper projections 43C, 43D on the extended end thereof. The stopper projections 43C, 43D are inserted through the stopper hole 12E into the space 12S to be stopped by the hole edge of the stopper hole 12E of the connection wall 12C. According to the configuration, the clip 40 can be fitted to the connection wall 12C of the upper board 12 and the light guide member 33 can be easily mounted on the door trim 1.

In this embodiment, another portion of the light guide member 33 that is different from the portion covered with the light guide member mounting member 48 is covered with the light blocking cover 50 and mounted on a portion of the door trim 1 near the joint portion between the boards or a portion having a fixing through hole with holding members 18. The holding members 18 project from the vehicular exterior side surface of the door trim 1. Each of the holding members 18 includes two opposite wall portions 18A that are inclined to be closer to each other as they extend farther from the vehicular exterior side surface of the door trim 1. The light guide member 33 is mounted on the door trim 1 while a portion of the light guide member 33 being covered with the light blocking cover 50 and held by the holding members 18. The light blocking cover 50 is a tubular member having the long slit 51A along the axial direction. The light blocking cover 50 includes the body portion 51 that covers an entire circumferential surface of a portion of the light guide member 33 and the first flange portion 52A and the second flange portion 52B that project from the respective long edges 51B, 51C of the long slit 51A. When the portion of the light guide member 33 is arranged in the space 51S of the body portion 51, the light guide member 33 is between the wall portions 18A of each holding member 18 and is supported by the distal end portions of the holding member 18 while the two opposing flange portions 52A, 52B being overlapped with each other.

The light guide member 33 is easily mounted on the door trim 1 while a portion of the light guide member 33 being covered with the light blocking cover 50. According to such a configuration, when the light guide member 33 is mounted near the joint portion between the components of the door trim 1, the light from the lighting device 30 is less likely to leak through an unintentional portion such as the joint portion to the vehicular interior side. Since the light guide member 33 is covered with the light blocking cover 50, the light is less likely to exit through the portion of the light guide member 33 other than the portion opposite the slit S and a greater amount of light rays among the light rays that are emitted by the LED 31 can travel within the light guide member 33 to the end portion (having the end surface 33A) of the light guide member 33.

In this embodiment, as illustrated in FIGS. 1 and 2, the door trim 1 includes the through hole 13H, which is through the lower board 13, in addition to the slit S. The lighting device 30 includes one LED 31 and one light guide member 33 and the light guide member 33 is arranged on the vehicular exterior side surface of the door trim 1 to be opposite the openings of the slit S and the through hole 13H. According to such a configuration, light can be supplied to multiple portions of the door trim 1 with one lighting device 30 without increasing the number of the LED 31 and the light guide member 33. Furthermore, the lighting device 30 includes only one LED 31, which is relatively expensive, and the longitudinal light guide member 33, which is relatively inexpensive. This achieves supplying of light to the portions of the door trim 1 that are away from each other at low cost. The longitudinal light guide member 33 can be mounted in an appropriate position of the door trim 1 with the clips 40 easily, stably, and precisely and can be appropriately used in the technology described herein.

In this embodiment, the door trim 1 includes at least the upper board 12 and the lower board 13 that are fitted together. The door trim 1 further includes the door inside handle bezel 3, the armrest 4, and the door pocket 5. The single light guide member 33 is disposed to be routed along the door inside handle bezel 3, the border section between the upper board 12 and the lower board 13, which are fitted together, the armrest 4, the door pocket 5. The technology described herein includes the door trim 1 having such a configuration effectively exerts the advantageous effects thereof. According to such a configuration, the portions of the door trim 1 can be effectively supplied with light by the lighting device 30 that includes the single LED 31 and the single light guide member 33. This achieves the mounting assembly of the lighting device and the vehicular interior component at low cost.

A mounting assembly 200 of a lighting device and a vehicular interior component according to another embodiment will be described with reference to FIGS. 11 to 20. The configurations of the door trim 1, the trim board 2, and the lighting device 30 that are similar to those described above will not be described.

<Mounting of Lighting Device>

As illustrated in FIGS. 1, 2, and 15A to 15D, the trim board 2 includes the through hole 13H as the lighting hole above the door pocket 5. The through hole 13H is a quadrangular through hole. In the following, the mounting assembly 200 of the door trim 1 and the lighting device 30 (the light guide member 33) will be described. In the mounting assembly 200, the light guide member 33 is fixed to the surrounding of the through hole 13H (the lighting hole).

Configurations of the door pocket 5 and the surroundings thereof will be described. As illustrated in FIGS. 1 and 2, the door pocket 5 includes a pocket space that is defined between the vehicular exterior side surface of the projected portion of the lower board 13 and the vehicular interior side surface of the pocket board 15. The lower board 13 and the pocket board 15 are coupled to each other in the vehicular interior-exterior direction. The pocket opening 5A is defined by the upper edge of the pocket board 15 and the upper edge of the projected portion of the lower board 13. The lower board 13 includes a recessed portion 13A above the pocket opening 5A and the vehicular interior surface of the recessed portion 13A is smoothly continuous to the vehicular interior side surface of the pocket board 15. The recessed portion 13A is spaced away from the projected portion of the lower board 13 in the vehicular width direction by a distance corresponding to the width of the door pocket 5. The recessed portion 13A is on the vehicular exterior side with respect to the portion of the lower board 13 corresponding to the pocket 5.

As illustrated in FIGS. 15A to 15D, the through hole 13H, which is the lighting hole, is formed in the recessed portion 13A and above the door pocket 5. The vehicular interior side surface of the recessed portion 13A faces downward and faces the door pocket 5 and the pocket opening 5A. Therefore, the through hole 13H is not seen from an occupant who is seated on a seat. The light from the lighting device 30 is directly supplied to the inside of the door pocket 5 through the through hole 13H.

Figure 11:
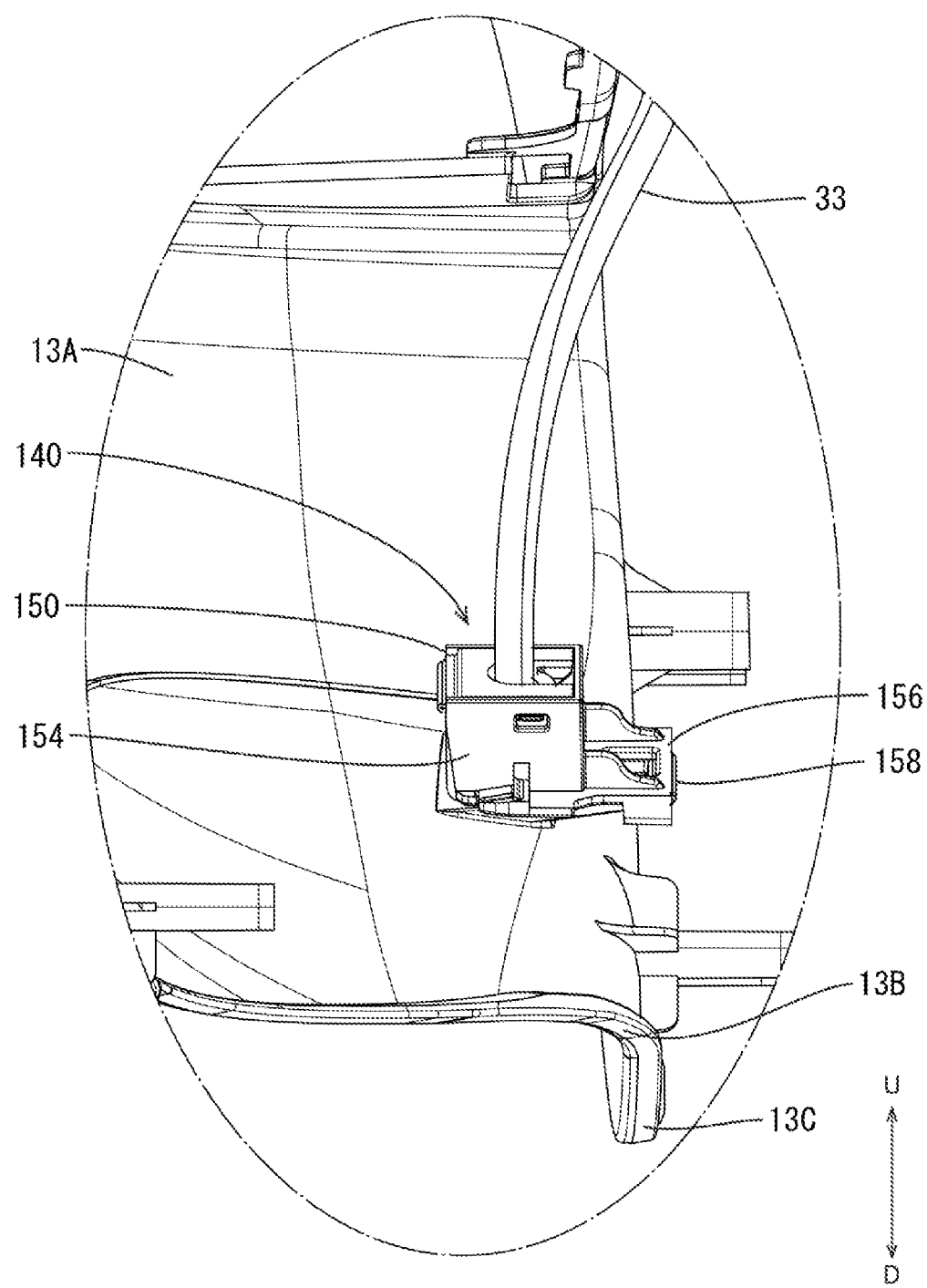
FIG. 11 is a perspective view illustrating a light guide member mounting member in which an end portion of the light guide member is fitted and that is mounted on the door trim.
Figure 12:
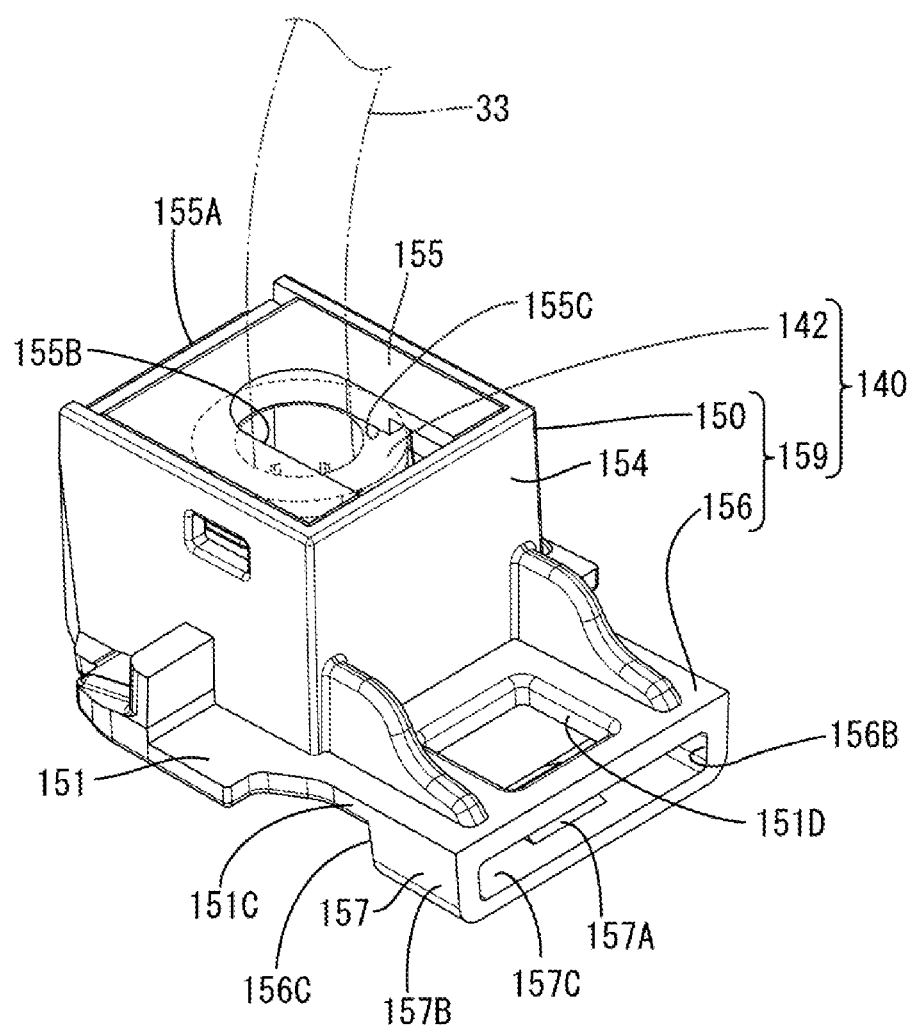
FIG. 12 is a perspective view illustrating the light guide member mounting member.
Figure 13:
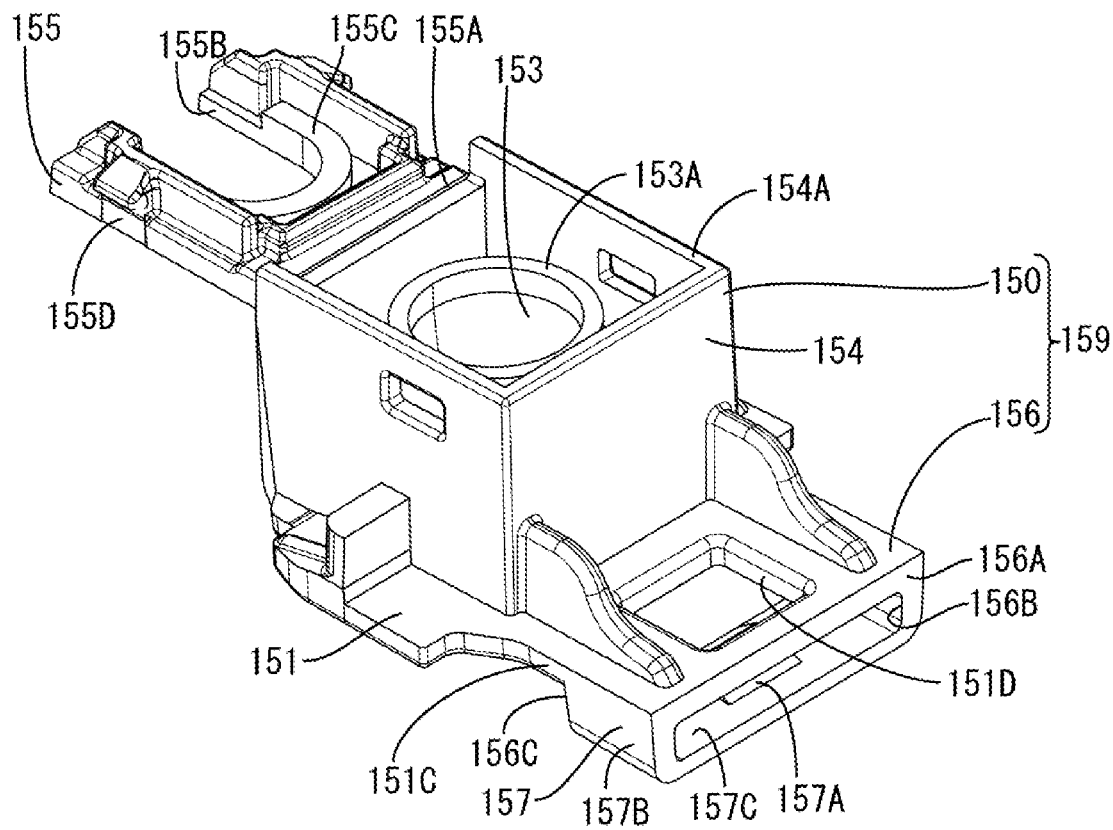
FIG. 13 is a perspective view illustrating a light guide member holder.

The light guide member 33 includes the end portion (a second end portion) of the light guide member 33 including an end surface 33A (the second end surface) and the end portion including the end surface 33A is opposite from the end portion (a first end portion) of the light guide member 33 connected to the LED 31. As illustrated in FIG. 11, the end portion including the end surface 33A is fixed to the lower board 13 with a light guide member mounting member 140. Specifically, the end portion of the light guide member 33 is fixed to the vehicular exterior side surface of the recessed portion 13A of the lower board 13. As illustrated in FIGS. 12 and 13, the light guide member mounting member 140 includes a light guide member holder 159 and a sleeve 142 (the intermediate member). The light guide member holder 159 includes a support portion 150 (the support portion) and a fitting portion 156 (the fitting portion). The support portion 150 has light blocking properties.

Figure 14:
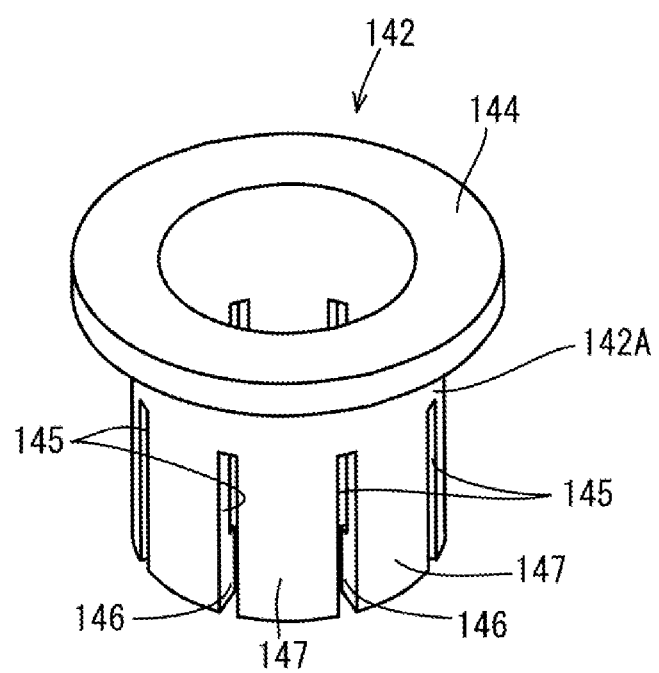
FIG. 14 is a perspective view illustrating a sleeve.

The sleeve 142 will be described with reference to FIG. 14. The sleeve 142 includes a body portion 142A and a flange portion 144. The body portion 142A has a circular tubular shape having two openings at the ends thereof and a through hole therein. The light guide member 33 can be inserted through the through hole of the body portion 142A. The body portion 142A includes eight slits 145 at one end having an opening 142B and the slits 145 extend along the axial direction of the body portion 142A to the end. The body portion 142A includes separate portions 147 that are defined by the slits 145 and includes projections 146 at the end portions of the respective separate portions 147. The projections 146 project inward from the inner surfaces of the separate portions 147, respectively, in the radial direction, which is perpendicular to the axial direction of the body portion 142A. The distance between the opposing projections 146 that are opposite in the radial direction is about same as or slightly greater than a diameter of the light guide member 33. In a normal state, the light guide member 33 is just fitted in the body portion 142A or slightly loosely fitted in the body portion 142A. The sleeve 142 includes the flange portion 144 at another end of the body portion 142A and the flange portion 144 extends outward in the radial direction from the body portion 142A.

Figure 15A:
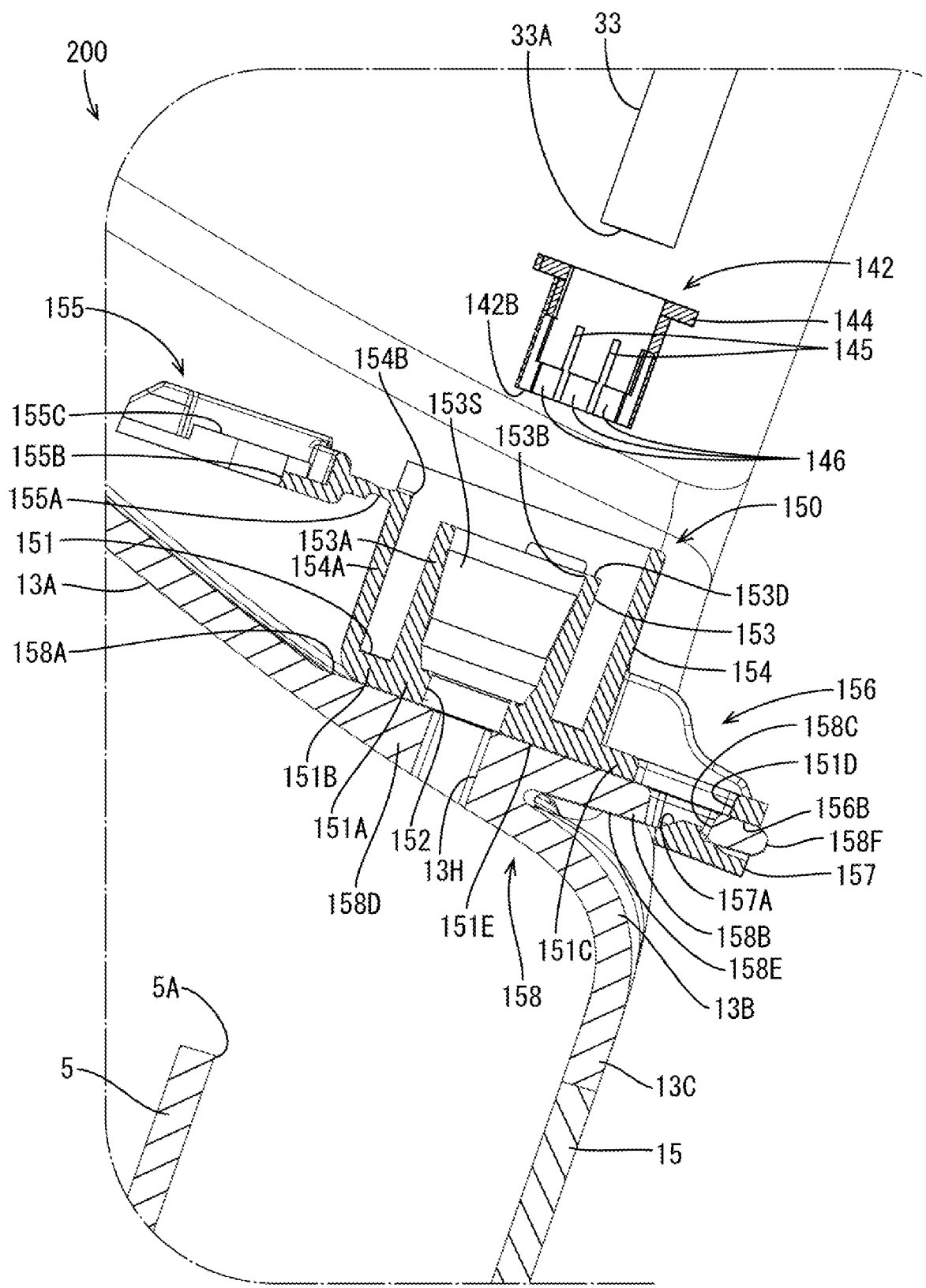
FIG. 15A is a cross-sectional view illustrating the mounting assembly before the light guide member is mounted in the light guide member mounting member.

As illustrated in FIGS. 13 and 15A, the support portion 150 includes a base portion 151 that is a plate member, an inner support portion 153 (a support portion, a cover portion, a curved wall) that has a tubular shape, an outer support portion 154 (the support portion, the cover portion), and a lid portion 155. The base portion 151, the inner support portion 153, the outer support portion 154, and the lid portion 155 have light blocking properties. The base portion 151 has an upper surface that is opposite the recessed portion 13A and an outer surface 151E that is an opposite surface of the upper surface. The inner support portion 153 includes an inner base portion 151A that is a portion of the base portion 151 and a tubular inner wall 153A (the curved wall) that extends from the upper surface of the inner base portion 151A. The inner base portion 151A is surrounded by the inner wall 153A. The inner support portion 153 has a space 153S that is defined by the inner wall 153A and the inner base portion 151A and the sleeve 142 is inserted into the space 153S in the axial direction of the inner wall 153A. The inner support portion 153 has an insertion opening 153B at the extended end of the inner wall 153A. The inner base portion 151A includes a through hole 152 (an opening, a communication hole). The outer support portion 154 is outside the inner support portion 153. The outer support portion 154 includes an outer base portion 151B that is a portion of the base portion 151 and outer walls 154A that extend from the upper surface of the outer base portion 151B. The outer base portion 151B is surrounded by the outer walls 154A. The outer support portion 154 has an insertion opening 154B at the extended ends of the outer walls 154A. The outer base portion 151B is continuous from the inner base portion 151A.

Figure 15B:
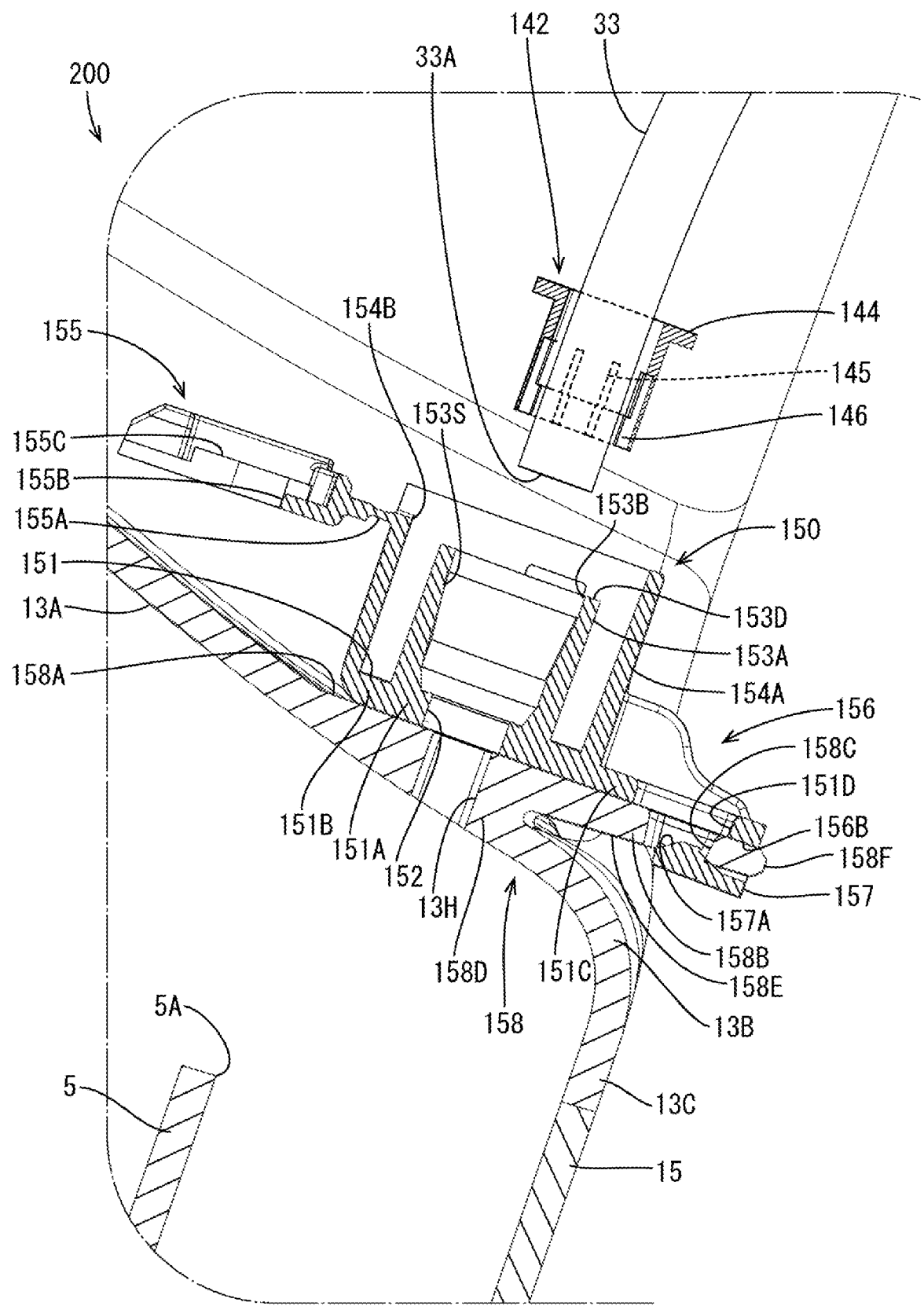
FIG. 15B is a cross-sectional view illustrating the mounting assembly in which the light guide member is inserted through the sleeve.
Figure 15C:
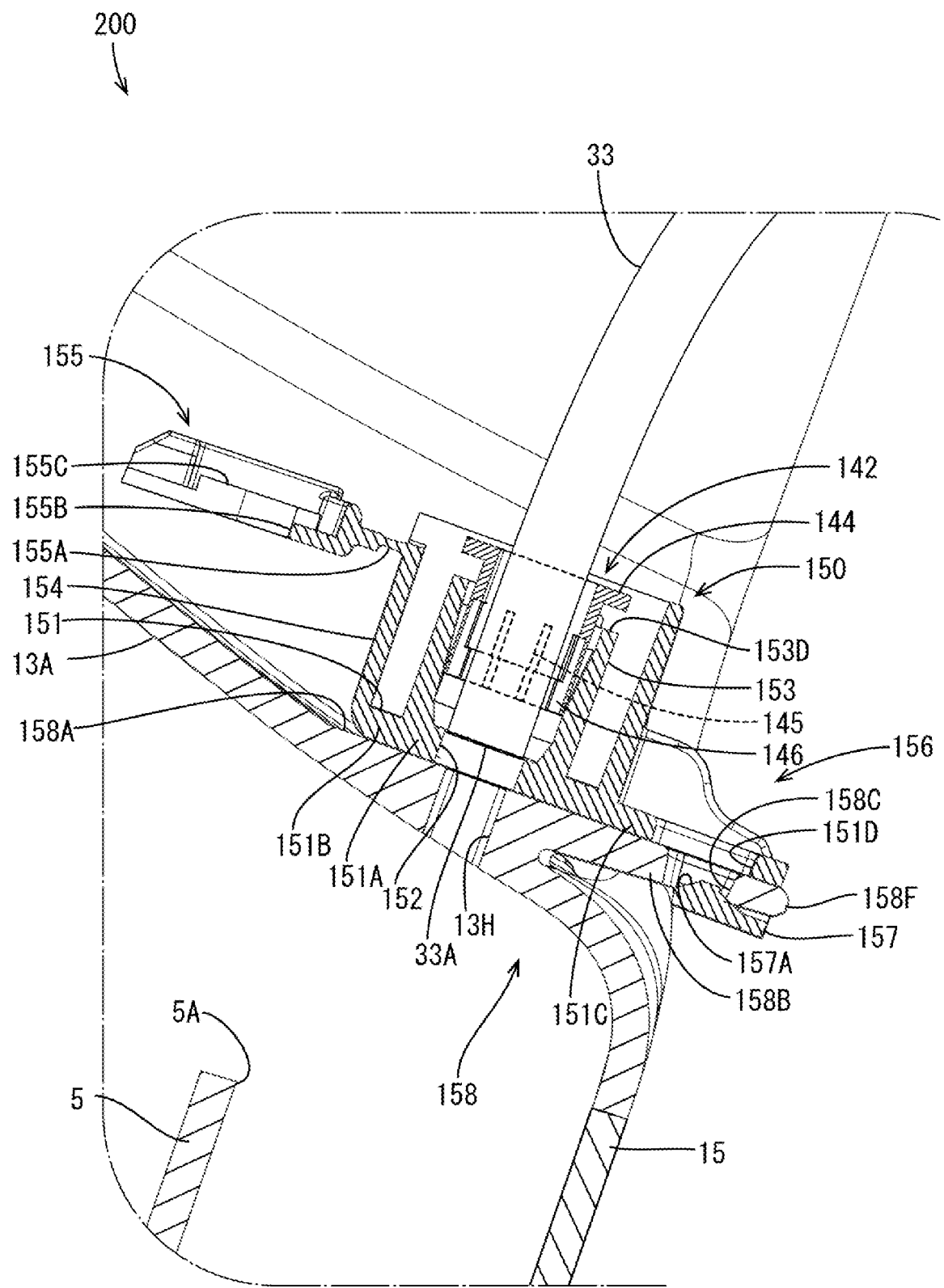
FIG. 15C is a cross-sectional view illustrating the mounting assembly in which an end surface of the light guide member is contacted with a base portion of a support portion.
Figure 15D:
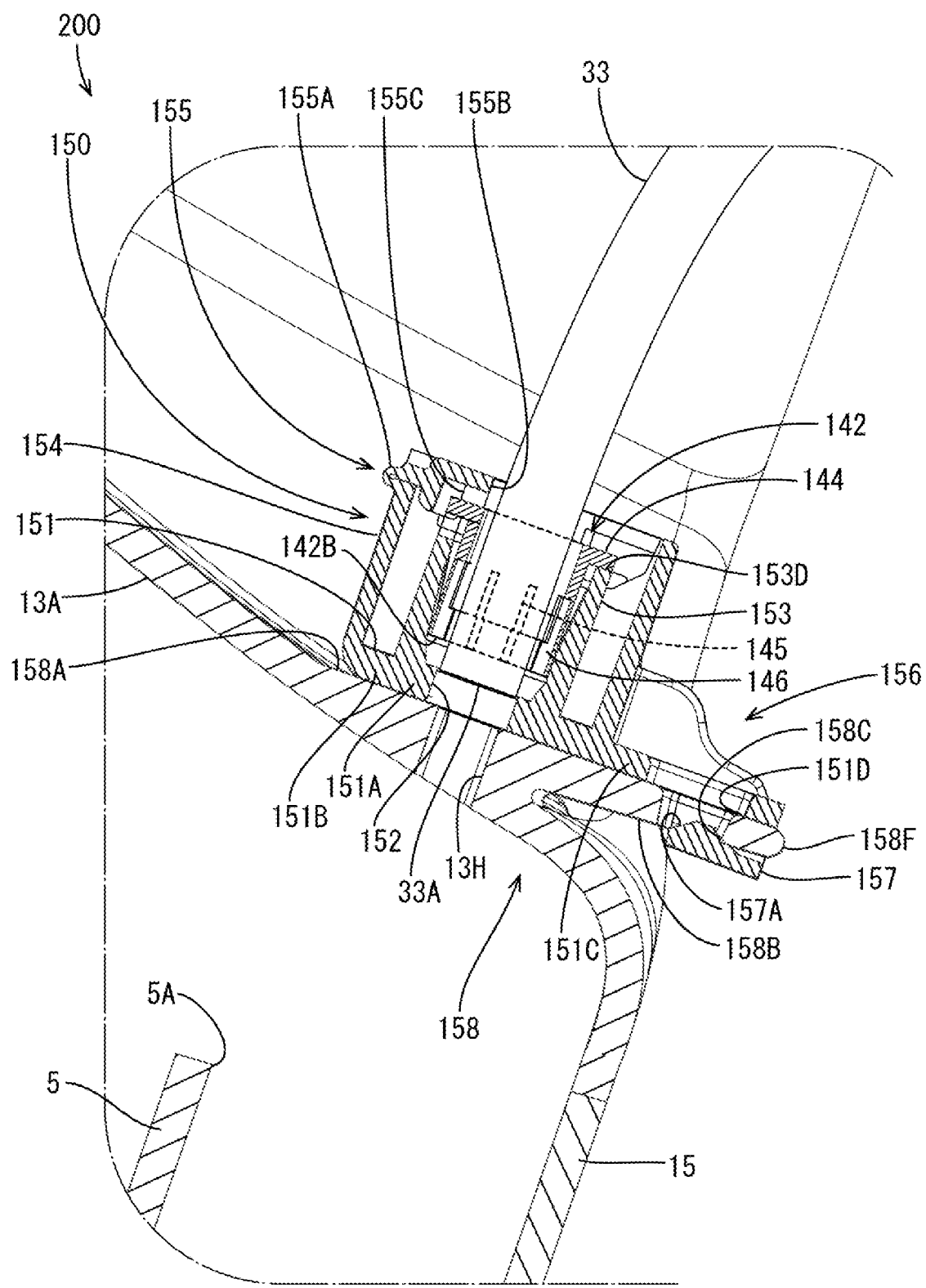
FIG. 15D is a cross-sectional view illustrating the mounting assembly in which a flange portion of the sleeve is contacted with a top surface of the support portion.
Figure 16:
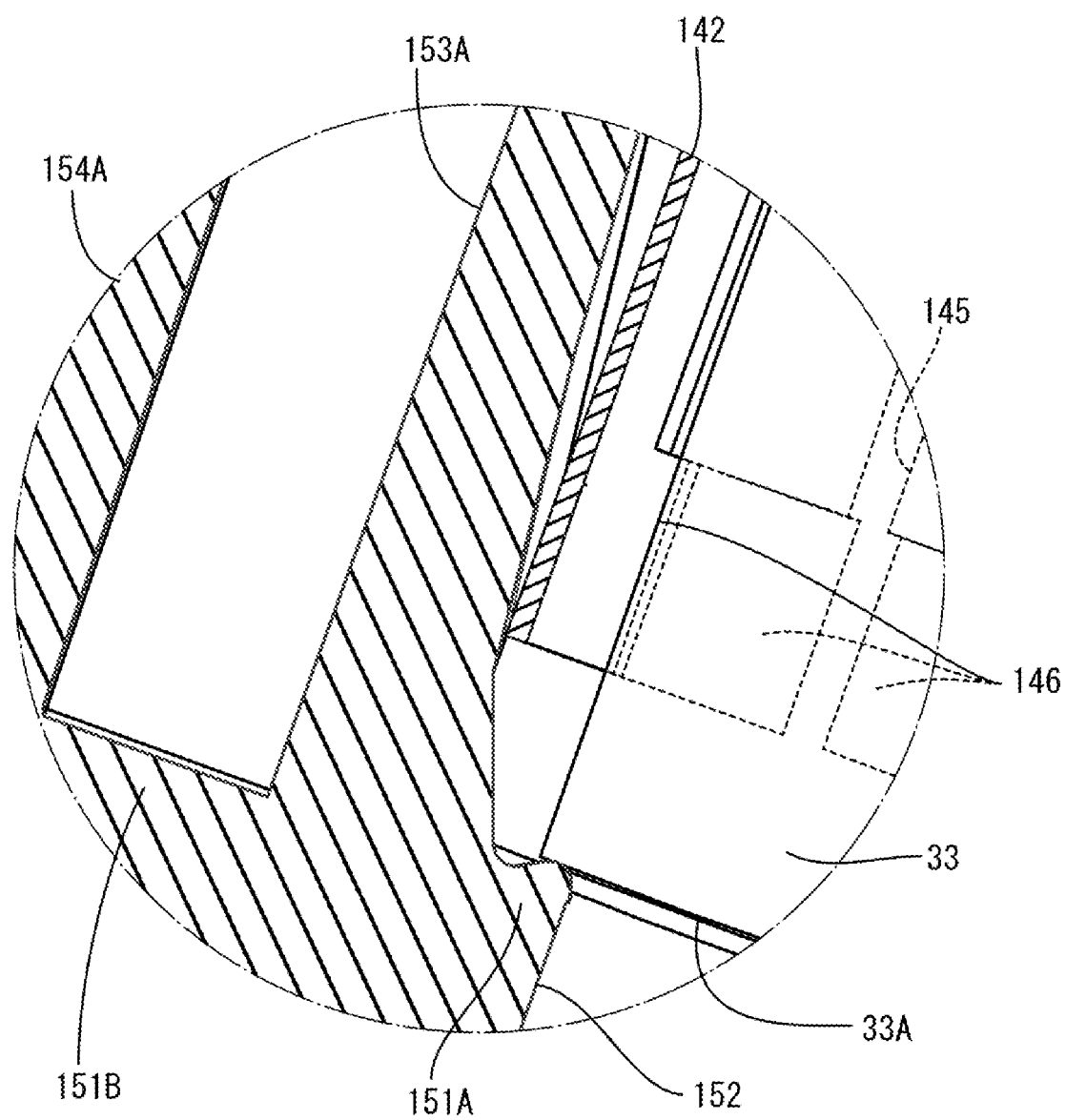
FIG. 16 is an enlarged cross-sectional view of a portion of FIG. 15D.

As illustrated in FIGS. 15D and 16, when the end portion of the light guide member 33 is put in the inner support portion 153, the end surface 33A of the end portion that is inserted through the sleeve 142 is contacted with the inner base portion 151A. The inner base portion 151A includes a through hole 152 (a communication hole) that is slightly smaller than the end surface 33A. The light guide member 33 cannot pass through the through hole 152. As illustrated in FIGS. 15C and 15D, the end surface 33A is on the inner base portion 151A and spaced from the outer surface 151E of the base portion 151 and is within the support portion 150. The through hole 152 is through the thickness of the inner base portion 151A. The through hole 152 is continuous to the through hole 13H when the support portion 150 is arranged on the vehicular exterior side surface of the recessed portion 13A.

As illustrated in FIGS. 15A to 15D, the space 153S of the inner support portion 153 is tapered toward the inner base portion 151A. The inner diameter of the inner support portion 153 is reduced as the inner wall 153A extends toward the inner base portion 151A. The distance between opposing wall portions of the inner support portion 153 is reduced as the inner wall 153A extends toward the inner base portion 151A. In this embodiment, the thickness of the inner wall 153A is increased as the inner wall 153A extends toward inner base portion 151A.

The inner diameter of the inner support portion 153 at the basal portion of the inner wall 153A near the inner base portion 151A is smaller than the outer diameter of the end portion of the sleeve 142 including the slits 145. The inner diameter of the inner support portion 153 at the end portion of the inner wall 153A near the insertion opening 153B is larger than the outer diameter of the flange portion 144 side end portion of the body portion 142A and smaller than the outer diameter of the flange portion 144.

As illustrated in FIGS. 15C and 15D, the body portion 142A of the sleeve 142 is inserted in the space 153S of the inner support portion 153 from the end portion thereof including the slits 145. As the body portion 142A is inserted into the space 153S, the body portion 142A of the sleeve 142 is deformed such that the separate portions 147 are moved closer to each other in the radial direction by the inner wall 153A that is reduced in its inner diameter as it extends toward the inner base portion 151A. The diameter of the inserted end portion of the body portion 142A becomes smaller than the original diameter thereof. As illustrated in FIG. 15D, when the body portion 142A is inserted in the space 153S, the flange portion 144 is arranged on a top surface 153D of the inner wall 153A or a hole edge of the insertion opening 153B. Thus, the sleeve 142 is within the space 153S of the inner support portion 153 and does not move into the through hole 152.

The outer support portion 154 has a space that is defined by the four outer walls 154A that extend from the outer base portion 151B. The outer support portion 154 has a square box shape having the insertion opening 154B at the extended ends of the outer walls 154A. The outer walls 154A are outside and spaced from the inner wall 153A and surround the inner wall 153A. The outer support portion 154 has a space between the outer walls 154A and the inner wall 153A. The outer base portion 151B of the outer support portion 154 is a portion of the base portion 151. The upper surface of the outer base portion 151B and the upper surface of the inner base portion 151A are on the same level.

The lid portion 155 closes and opens the insertion opening 154B of the outer support portion 154. As illustrated in FIG. 13, the lid portion 155 includes a body portion 155D having a plate shape and a folding portion 155A. The folding portion 155A integrally extends from one edge of the body portion 155D of the lid portion 155 to one hole edge of the insertion opening 154B of the outer support portion 154. The folding portion 155A connects the lid portion 155 and the outer support portion 154. When the insertion opening 154B is closed with the lid portion 155, the lid portion 155 is pivoted around the folding portion 155A and the folding portion 155A is folded as illustrated in FIG. 15D. When the insertion opening 154B is opened, the lid portion 155 is pivoted around the folding portion 155A and the folding portion 155A becomes in a flat form as illustrated in FIG. 15A.

As illustrated in FIG. 13, the body portion 155D of the lid portion 155 includes a hole 155B in a middle portion thereof and the hole 155B has an opening at an edge of the body portion 155D opposite from the folding portion 155A. The distance between opposite hole edges of the hole 155B is greater than the diameter of the light guide member 33. The lid portion 155 includes an intermediate portion 155C around the hole edge of the hole 155B. The intermediate portion 155C projects from the back surface of the lid portion 155 to be opposite the inner support portion 153. When the lid portion 155 is closed while the end portion of the light guide member 33 is arranged in the support portion 150, the light guide member 33 is arranged in the hole 155B. Thus, the insertion opening 154B of the outer support portion 154 is closed with the lid portion 155 while the light guide member 33 being arranged in the support portion 150.

As illustrated in FIG. 15D, when the lid portion 155 is closed, the back surface of the lid portion 155 facing the base portion 151 is spaced away from the top surface 153D of the inner support portion 153. The distance between the back surface of the lid portion 155 and the top surface 153D is equal to or greater than a thickness of the flange portion 144. When the lid portion 155 is closed, the intermediate portion 155C is between the lid portion 155 and the top surface 153D to adjust the distance between the lid portion 155 and the top surface 153D.

The fitting portion 156 of the light guide member holder 159 will be described. The light guide member holder 159 is detachably mounted on the recessed portion 13A via the fitting portion 156. As illustrated in FIGS. 13 and 15A, the fitting portion 156 includes an extended body portion 151C and a U-shaped frame portion 157 below the extended body portion 151C. The extended body portion 151C extends from the outer base portion 151B and is a portion of the base portion 151. The frame portion 157 integrally extends from the outer surface 151E of the extended body portion 151C opposite the recessed portion 13A. As illustrated in FIG. 13, the frame portion 157 includes side walls 157B and a bottom wall 157C. The two side walls 157B extends from two opposing side edges of the extended body portion 151C, respectively. The bottom wall 157C connects the extended ends of the side walls 157B and extends parallel to the extended body portion 151C. The fitting portion 156 has an insertion space defined by the extended body portion 151C and the frame portion 157 including the side walls 157B and the bottom wall 157C. A receiving member 158 is fitted in the insertion space of the fitting portion 156.

The fitting portion 156 includes an outer opening 156B and an inner opening 156C that are open toward a direction perpendicular to the axial direction of the inner support portion 153 or the sleeve 142. The bottom wall 157C includes a stopper projection 157A that projects from a surface thereof opposite the extended body portion 151C toward the extended body portion 151C. The extended body portion 151C includes a checking window 151D in a portion corresponding to the stopper projection 157A when the light guide member holder 159 is fitted to the receiving member 158. The checking window 151D is through the extended body portion 151C in the thickness direction (in the axial direction of the inner support portion 153 and the sleeve 142).

As illustrated in FIG. 15A, the recessed portion 13A integrally includes the receiving member 158. As illustrated in FIGS. 15A to 15D, the recessed portion 13A of the lower board 13 includes a bent portion 13B and an extending portion 13C. The bent portion 13B extends continuously from the recessed portion 13A while being bent downward and the extending portion 13C further extends downward straight from the bent portion 13B and is continuous to the pocket board 15. The receiving member 158 extends such that the vehicular exterior side surface 158A of the receiving member 158 is vertical to the extending portion 13C. The receiving member 158 includes a base body portion 158D that increases thickness thereof as it extends toward the bent portion 13B.

The receiving member 158 further includes an extended portion 158B that extends from the base body portion 158D. The extended portion 158B has a plate shape having the vehicular exterior side surface 158A and an opposite surface 158E that is opposite from the vehicular exterior side surface 158A. The vehicular exterior side surface 158A and the opposite surface 158E are vertical to the extending portion 13C. The opposite surface 158E of the extended portion 158B is separated from the bent portion 13B. The extended portion 158B includes a stopper hole 158C that is through the extended portion 158B. The base body portion 158D includes the through hole 13H that extends parallel to the extending portion 13C.

The vehicular exterior side surface 158A of the receiving member 158 is flat and vertical to a direction in which the light exits the light guide member 33 or the extending direction of the through hole 13H. The light guide member holder 159 is arranged on the vehicular exterior side surface 158A that is a flat surface. The recessed portion 13A (the lower board 13) is bent downward at the bent portion 13B near the through hole 13H and the light guide member holder 159 may be necessary to be arranged in a small space. However, the receiving member 158 includes the extended portion 158B that extends from the base body portion 158D and has the flat vehicular exterior side surface 158A. Therefore, the vehicular exterior side surface 158A of the receiving member 158 has an area enough for holding the light guide member holder 159. The through hole 13H extends through the base body portion 158D and along the designed traveling direction of the light rays. The light rays exiting through the through hole 13H are directed toward the pocket opening 5A and reach an inner space of the door pocket 5.

As illustrated in FIG. 15A, the light guide member holder 159 is mounted on the receiving member 158 by inserting an extended end portion 158F of the extended portion 158B into the inner opening 156C of the fitting portion 156 and fitting the stopper projection 157A to the stopper hole 158C. When the light guide member holder 159 is mounted on the receiving member 158, the extended end portion 158F projects from the outer opening 156B. Thus, the extended portion 158B of the receiving member 158 is arranged in the space defined by the extended body portion 151C and the frame portion 157 and the light guide member holder 159 is fixed to the receiving member 158. Namely, the light guide member holder 159 is fixed to the vehicular exterior side surface of the lower board 13. An operator can see whether the stopper projection 157A is surely fitted in the stopper hole 158C through the checking window 151D. Although details will not be described, after the light guide member 33 is fitted in the light guide member mounting member 140, the light guide member mounting member 140 including the light guide member 33 may be fixed to the receiving member 158.

Next, as illustrated in FIG. 15B, the light guide member 33 is inserted through the sleeve 142 such that the end portion having the end surface 33A projects from the end of the sleeve 142 through the opening 142B. The end portion of the sleeve 142 having the slits 145 is closer to the end surface 33A of the light guide member 33. The lid portion 155 is opened and the end portion (the second end portion) of the light guide member 33 is put in the space 153S of the inner support portion 153 and the end surface 33A of the light guide member 33 is contacted with the inner base portion 151A. In this state, the sleeve 142 is not disposed in the inner support portion 153 and is outside the inner support portion 153 while having the light guide member therethrough.

Then, as illustrated in FIGS. 15C and 15D, the sleeve 142 is moved along the light guide member 33 while keeping the end surface 33A to be contacted with the inner base portion 151A. As the body portion 142A is inserted into the space 153S, the body portion 142A of the sleeve 142 is deformed such that the separate portions 147 are moved closer to each other in the radial direction by the inner wall 153A that is reduced in its inner diameter as it extends toward the inner base portion 151A. Namely, a width of each slit 145 becomes smaller. The diameter of the inserted end portion of the body portion 142A becomes smaller than the original diameter thereof. Accordingly, the projections 146 of the sleeve 142 are contacted closely to the outer surface of the light guide member 33. When the sleeve 142 is moved until the flange portion 144 reaches and abuts the top surface 153D of the inner wall 153A, as illustrated in FIGS. 15D and 16, the projections 146 are pressed onto the peripheral surface of the light guide member 33 such that the light guide member 33 is not detached easily from the support portion 150. Accordingly, the light guide member 33 can be fixed to the lower board 13 while the position of the end surface 33A of the light guide member 33 being fixed.

<Tension Adjustment>

The long light guide member 33 that is routed via the multiple lighting portions may have a length greater than a length of a route just connecting the multiple lighting portions for routing and mount the light guide member 33 on the door trim 1 easily. In such a configuration, the light guide member 33 includes an extra portion for easy mounting operation. However, the extra portion of the light guide member 33 may cause loosening on the vehicular exterior side surface of the door trim 1 after the light guide member 33 is mounted on the door trim 1. This may hinder the mounting of the door trim 1 close to the door inner panel.

As illustrated in FIG. 2, the door trim 1 includes a tension adjuster 160 between two points P1 and P2 of the through holes. The two points P1, P2 are on the route of the light guide member 33. The extra portion of the light guide member 33 is absorbed and the route length of the light guide member 33 is adjusted with the tension adjuster 160.

Figure 17:
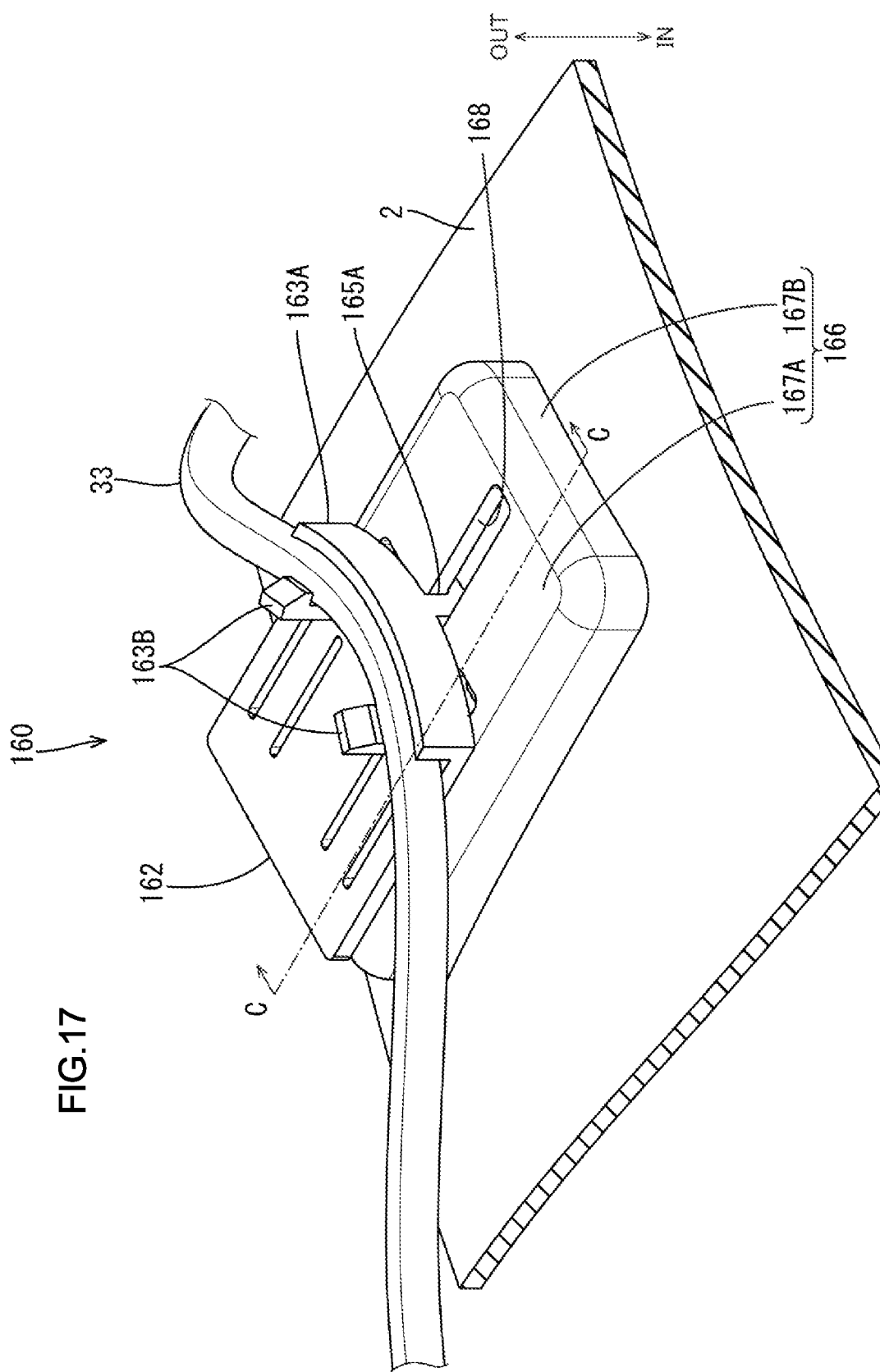
FIG. 17 is a perspective view illustrating a tension adjuster that supports the light guide member.

As illustrated in FIG. 17, the tension adjuster 160 includes a light guide member holder 161 and a base member 166. The light guide member holder 161 holds the light guide member 33. The base member 166 is disposed on the vehicular exterior side surface of the trim board 2 and supports the light guide member holder 161 such that the light guide member holder 161 moves parallel to the plate surface of the trim board 2.

Figure 18:
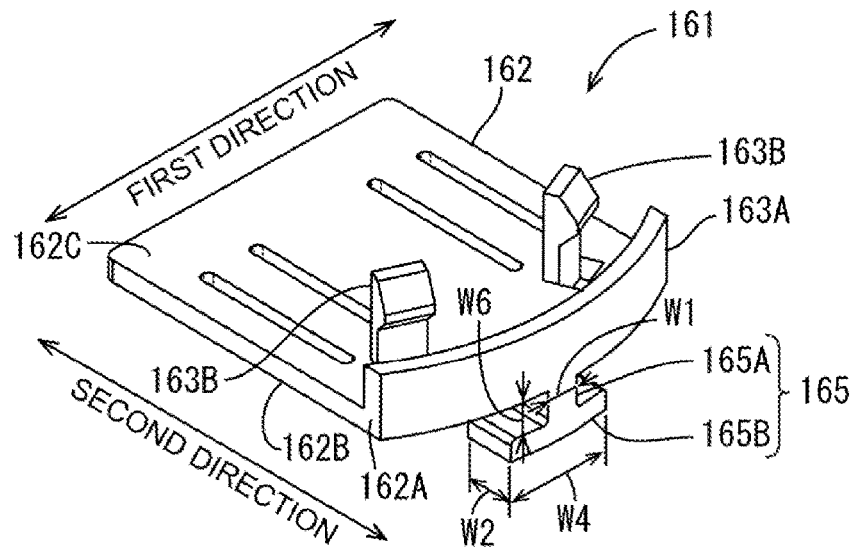
FIG. 18 is a perspective view illustrating a light guide member holder of the tension adjuster.
Figure 20:
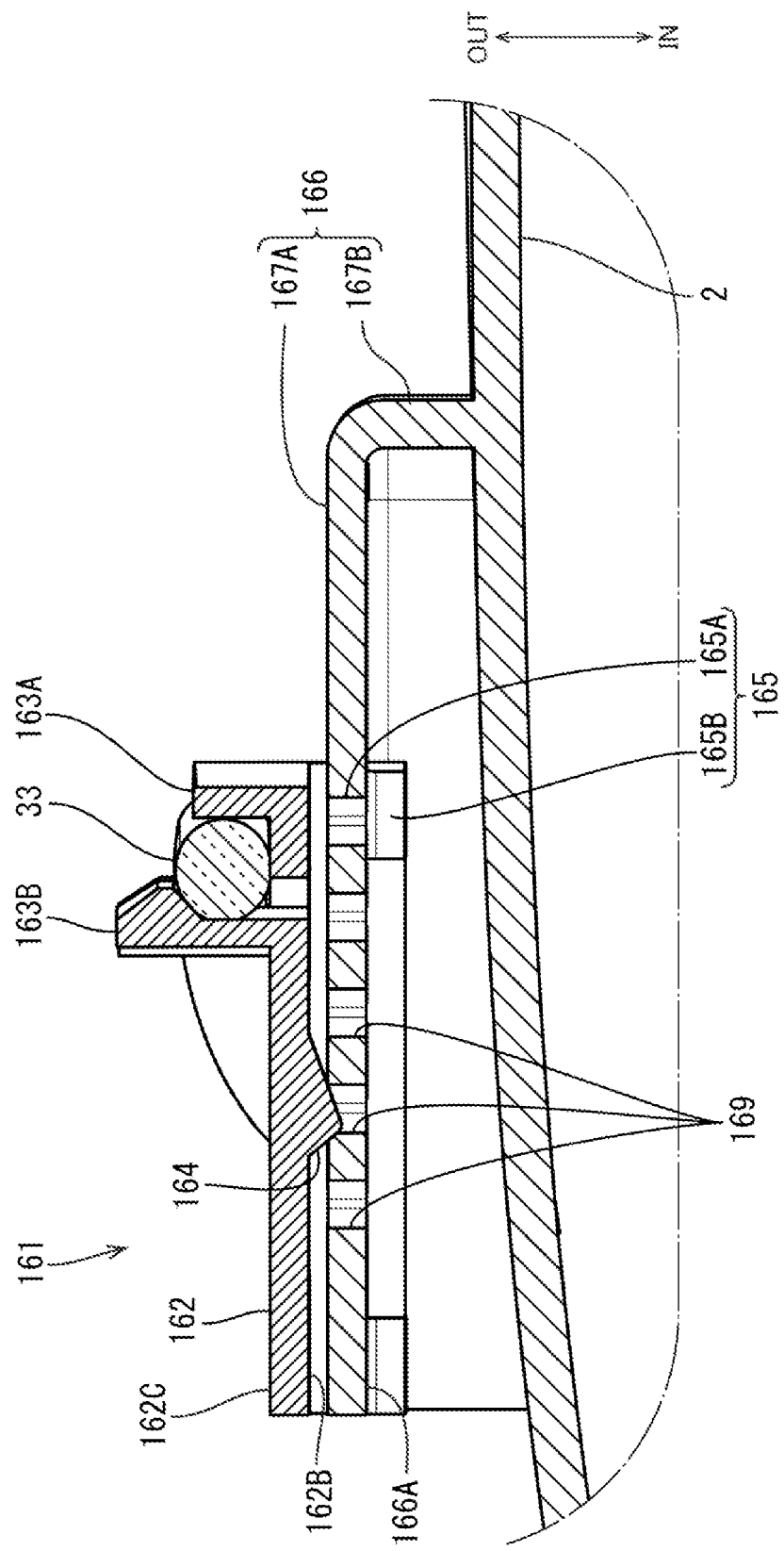
FIG. 20 is a cross-sectional view of the tension adjuster taken along C-C line in FIG. 17.

As illustrated in FIGS. 18 and 20, the light guide member holder 161 includes a holder body portion 162, which is a plate member, and a leg portion (an extended portion) 165. The holder body portion 162 has a front surface 162C and a back surface 162B that is an opposite surface of the front surface 162C. The leg portion 165 extends from the back surface 162B of a portion of the holder body portion 162 including a first edge 162A. The holder body portion 162 includes a holder wall 163A and light guide member stoppers 163B. The holder wall 163A extends from the front surface 162C of the first edge 162A of the holder body portion 162. The light guide member stoppers 163B project from the front surface 162C near the first edge 162A so as to be opposite the holder wall 163A.

As illustrated in FIG. 18, the first edge 162A is a curved edge and the holder wall 163A is a curved long wall that extends along the first edge 162A. Two light guide member stoppers 163B are spaced away from the holder wall 163A. Each of the light guide member stoppers 163B includes a support portion that projects from the first surface 162C and a projection that projects from a projected end of the support portion toward the holder wall 163A. The light guide member 33 is held between the holder wall 163A and the light guide member stoppers 163B.

The leg portion 165 includes an extended portion 165A and a holder stopper 165B. The extended portion 165A extends from the back surface 162B of the holder body portion 162 and is continuous from the middle portion of the holder stopper 165B. The holder body portion 162 has a short edge that is an opposite edge from the first edge 162A and long edges that are opposite each other. The short edge extends in a first direction (a width direction) and the long edges extend in a second direction (a longitudinal direction) that is perpendicular to the first direction. As illustrated in FIG. 18, the extended portion 165A has a square columnar shape. The extended portion 165A has a dimension W1 that extends in the first direction and smaller than a dimension W2 that extends in the second direction. As illustrated in FIG. 20, the holder body portion 162 includes two holder stopper projections 164 in a middle section of the holder body portion 162 with respect to the second direction. The holder stopper projections 164 are spaced from each other in the first direction and project from the back surface 162B. The holder stopper projections 164 have a triangular cross-sectional shape taken along the second direction.

Figure 19:
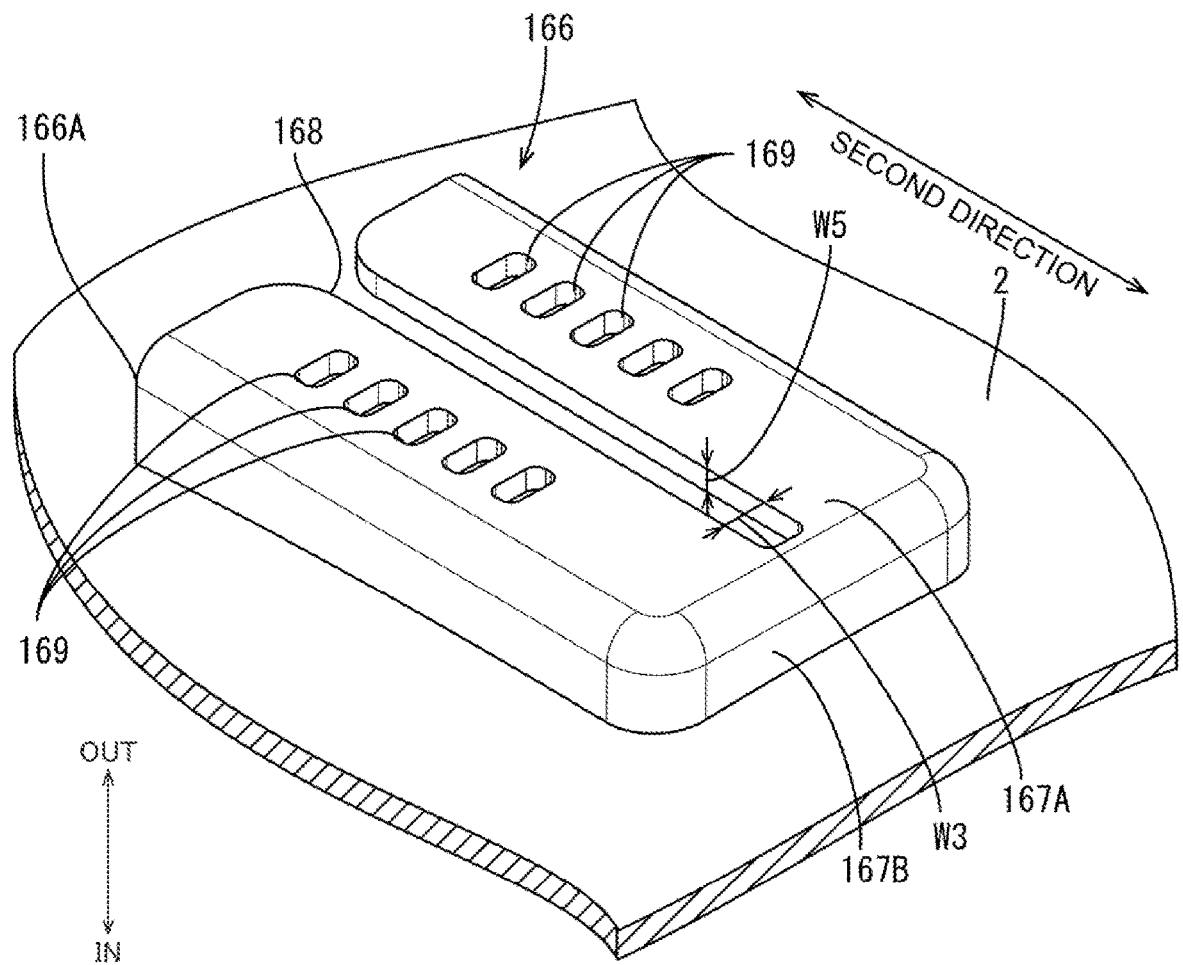
FIG. 19 is a perspective view illustrating a base member of the tension adjuster.

As illustrate in FIG. 19, the base member 166 includes a base body portion 167A and a base wall portion 167B. The base body portion 167A is a quadrangular plate member that extends parallel to the plate surface of the trim board 2. The base wall portion 167B extends between the trim board 2 and the base body portion 167A and supports the base body portion 167A away from the plate surface of the trim board 2. The base body portion 167A includes four edges and the base wall portion 167B extends from three out of the four edges and connects the base body portion 167A and the trim board 2. The base member 166 includes an opening 166A at a remaining edge of the four edges and a slit 168 (one example of a guide hole) that extends continuously from the opening 166A.

As illustrated in FIG. 2, the trim board 2 includes the base member 166 between two points P1 and P2 on the routing of the light guide member 33. The through holes are provided at the two points P1 and P2. The base member 166 is between the two points P1 and P2 such that the slit 168 is perpendicular to a line connecting the two points P1 and P2. The opening 166A of the base member 166 is closer to the line than the base wall portion 167B is. As illustrated in FIG. 19, the width W3 of the slit 168 is slightly greater than the dimension W1 of the extended portion 165A and smaller than the dimension W4 of the holder stopper 165B extending in the first direction and is smaller than the dimension W2 of the extended portion 165A. The base body portion 167A has a hole edge of the slit 168 and the thickness W5 of the hole edge is slightly smaller than a length W6 of the extended portion 165A. The length W6 of the extended portion 165A is a dimension between the back surface 162B of the holder body portion 162 and the holder stopper 165B.

The base member 166 includes stopper holes 169 in the base body portion 167A. Two lines of stopper holes 169 extend along the slit 168 so as to sandwich the slit 168 therebetween. When the extended portion 165A of the light guide member holder 161 is inserted in the slit 168, each of the two holder stopper projections 164 is put in each of two stopper holes 169 of the respective two lines of stopper holes 169.

An operation of adjusting the length of the light guide member 33 will be described. As illustrated in FIG. 17, the extra portion of the light guide member 33 is put in a space between the holder wall 163A and the light guide member stoppers 163B. Then, the leg portion 165 is inserted into the slit 168 through the opening 166A of the base member 166. Accordingly, as illustrated in FIG. 17, the extended portion 165A is within the slit 168 and the hole edge of the slit 168 is between the back surface 162B of the light guide member holder 161 and the holder stopper 165B. Accordingly, the position of the holder body portion 162 in the height direction (the thickness direction of the base body portion 167A) is determined with respect to the base member 166 (the trim board 2).

The extended portion 165A is allowed to move within the slit 168 along the plate surface of the base member 166 (the trim board 2). This allows the light guide member holder 161 to be moved along the slit 168 and along the plate surface of the trim board 2. Thus, the light guide member holder 161 is moved along the slit 168 from the opening 166A to an opposite end of the slit 168 that is opposite from the opening 166A while holding the light guide member 33. Accordingly, the portion of the light guide member 33 held by the light guide member holder 161 is pulled in the movement direction in which the light guide member holder 161 is moved (in the extending direction of the slit 168). Thus, the loosening of the light guide member 33 is absorbed. According to the movement of the light guide member holder 161 along the slit 168 as described above, the actual routing length of the light guide member 33 becomes longer than the length of the line connecting the points P1 and P2. Therefore, the light guide member 33 including the extra portion can be routed without having loosening.

When the light guide member holder 161 is moved along the slit 168 between the opening 166A and the opposite end of the slit 168, the holder stopper projections 164 are fitted in the respective stopper holes 169 to determine the position of the light guide member holder 161. If the light guide member holder 161 is further moved from the determined position along the slit 168, the holder stopper projection 164 comes out of the determined stopper hole 169 and moved along the base body portion 167A between the determined stopper hole 169 and an adjacent stopper hole 169 next to the determined stopper hole 169 and fitted in the adjacent stopper hole 169. Thus, the movement amount of the light guide member holder 161 is adjusted according to the length of the extra portion of the light guide member 33 such that the loosening of the light guide member 33 can be appropriately absorbed.

In the door trim 1 having the above configuration, the trim board 2 integrally includes the receiving member 158 and the base member 166. The method of forming the receiving member 158 and the base member 166 integrally with the trim board 2 is not particularly limited. For example, the receiving member 158 and the base member 166 may be molded integrally with the trim board 2 with injection molding. Or the base member 166 and the receiving member 158 or the extended portion 158B of the receiving member 158 that are previously prepared may be integrally molded with the trim board 2 with insert molding when the trim board 2 is produced by compressing a preboard with compression molding.

According to the mounting assembly 200 of the lighting device 30 and the door trim 1 (the vehicular interior component), the lighting device 30 is arranged on the vehicular exterior side surface of the door trim 1 and includes the LED 31 (the light source) and the light guide member 33 that is long and within which the light emitted by the LED 31 travels. The door trim 1 is a plate member and includes lighting holes (through holes) including the through hole 13H. The light that travels within the light guide member 33 and exits the light guide member 33 is supplied through the through hole 13H from the vehicular exterior side surface to the vehicular interior side surface of the door trim 1. The light guide member 33 is arranged such that one end surface 33B thereof is opposite the LED 31 and light that exits the light guide member 33 through at least two through holes including the through hole 13H. The light guide member 33 is arranged on the vehicular exterior side surface of the door trim 1 and the end portion of the light guide member 33 is fixed such that the end surface 33A of the light guide member 33 is opposite the through hole 13H to keep a distance between the end surface 33A and the through hole 13H.

In the method of mounting the light guide member according to a prior art, the position of the end surface of the light guide member is not fixed and may be changed according to the various lengths of the light guide member. Accordingly, the characteristics of the light rays that are supplied to the vehicular interior space may not be adjusted properly. Such a problem will be serious if the end surface of the light guide member that is to be fixed is far away from another lighting point. However, according to the above configuration of the mounting assembly 200 of the lighting device and the vehicular interior component, the end portion of the long light guide member 33 is mounted in an appropriate position on the door trim 1 simply and stably.

The light guide member mounting member 140 includes the light guide member holder 159 and the sleeve 142 (the intermediate member). The sleeve 142 is a tubular member through which the light guide member 33 is inserted and includes the slits 145 at the end portion of the body portion 142A. The slits 145 extend in the axial direction of the sleeve 142. The light guide member holder 159 includes the support portion 150 on the vehicular exterior surface side of the door trim 1 and the sleeve 142 is able to be inserted in the support portion 150 in the axial direction of the sleeve 142. The support portion 150 includes the base portion 151 and the inner support portion 153. The end surface 33A of the light guide member 33 that is inserted through the sleeve 142 is contacted with the inner base portion 151A. The inner support portion 153 extends upward from the inner base portion 151A of the base portion 151. The inner diameter of the inner support portion 153 is reduced as the inner wall 153A extends closer to the inner base portion 151A. The inner base portion 151A has the trough hole 152 that is continuous to the through hole 13H. The sleeve 142 is moved along the light guide member 33 closer to the inner base portion 151A while the end portion including the end surface 33A that is inserted through the sleeve 142 being contacted with the inner base portion 151A. According to the moving of the sleeve 142 along the light guide member 33, the end portion of the sleeve 142 including the slits 145 is deformed in the radial direction by the inner support portion 153 whose diameter is gradually reduced to hold the light guide member 33 and the sleeve 142 is fitted in the support portion 150. Accordingly, the light guide member 33 is fixed to the door trim 1 while determining and fixing the position of the end surface 33A.

According to the above configuration, the position of the end surface 33A of the light guide member 33 is determined by the inner base portion 151A of the support portion 150. For example, the position of the end surface 33A is defined on the inner surface of the inner base portion 151A. The light guide member 33 can be fixed to the door trim 1 while determining the position of the end surface 33A. The end portion of the light guide member 33 can be fixed with reference to the axial direction of the sleeve 142. The posture of the support portion 150 with respect to the door trim 1 can be changed to vary the directivity of the light that exits through the end surface 33A of the light guide member 33. According to such a configuration, the characteristics of the light that exits through the through hole 13H of the door trim 1 can be easily varied. For example, the direction in which the light is supplied and a distance from the end surface 33A to the surface of the door trim 1 can be varied easily. Since the end surface 33A of the light guide member 33 is arranged within the support portion 150, dust or other obstacles are less likely to be adhered on the end surface 33A when the lighting device 30 is mounted on the door trim of the vehicle is used.

In the mounting assembly 200 of the lighting device and the vehicular interior component, the door trim 1 includes the receiving member 158 on which the light guide member holder 159 is detachably fixed. The receiving member 158 includes the through hole 13H. According to such a configuration, the light guide member 33 can be fixed to the door trim 1 while the end portion of the light guide member 33 being arranged in the support portion 150. The end portion of the light guide member 33 can be easily fixed to a curved portion of the door trim 1 to which the end portion of the light guide member 33 is not fixed easily while determining the position of the end surface 33A of the light guide member 33.

The sleeve 142 include the flange portion 144 at the end portion opposite from the separate portions 147 and the flange portion 144 extends radially from the body portion 142A. The inner wall 153A of the inner support portion 153 has the top surface 153D at the extended end of the inner wall 153A. The flange portion 144 is contacted with and stopped at the top surface 153D when sleeve 142 is moved toward the inner base portion 151A while the end surface 33A of the light guide member 33 that is inserted through the sleeve 142 being contacted with the inner base portion 151A. The support portion 150 includes the lid portion 155 that is movable with respect to the inner wall 153A and able to sandwich the flange portion 144 with the top surface 153D. According to such a configuration, the sleeve 142 that is put in the inner support portion 153 of the support portion 150 is fixed by holding the flange portion 144 between the inner wall 153A and the lid portion 155. Thus, the end portion of the light guide member 33 can be fixed more surely and the sleeve 142 does not come out of the support portion 150 even if the vehicle is vibrated during the running of the vehicle.

Another example of the mounting assembly of the lighting device and the vehicular interior component includes the tension adjuster 160. The tension adjuster 160 includes the light guide member holder 161 and the base member 166. The light guide member holder 161 holds the light guide member 33. The base member 166 is on the vehicular exterior side surface of the door trim 1 and supports the light guide member holder 161 such that the light guide member holder 161 is movable along the plate surface of the door trim 1.

According to the above configuration, the light guide member holder 161 that holds the light guide member 33 is movable with respect to the door trim 1. The light guide member 33 including the extra portion can be mounted on the light guide member holder 161 with using the extra portion easily and this improves operability. After the light guide member 33 is mounted on the light guide member holder 161, the loosening of the light guide member 33 caused by the extra portion can be suppressed or absorbed by moving the light guide member holder 161 with respect to the door trim 1 to provide tension to the light guide member 33. As a result, the mounting operation is less likely to be hindered by the loosened light guide member 33 when the door trim 1 is mounted on the body panel of a vehicle. Furthermore, during the running of the vehicle, the loosened light guide member 33 may swing and may be contacted with the door trim 1 or the body panel. This may cause noise or the position of the end surface 33A may be moved from the correct position. However, in this embodiment, such problems are less likely to be caused. Therefore, the lighting device 30 can be mounted on the vehicular interior component precisely, stably, and easily.

The base member 166 is between the two points P1 and P2 having the through holes and supports the light guide member holder 161 such that the light guide member holder 161 is moved in the direction crossing the line connecting the two points P1 and P2. According to the above configuration, the loosening of the light guide member 33 can be adjusted as appropriate.

In this embodiment, the base member 166 includes the slit 168 (the guide rail) that extends in the direction crossing the line connecting the two points P1 and P2. The light guide member holder 161 includes the leg portion 165 (the extended portion, a stopper) that is stopped by the hole edge of the slit 168. According to such a configuration, the loosening of the light guide member 33 can be adjusted as appropriate.

The tension adjuster 160 includes a stopper portion (including the holder stopper projections 164 and the stopper holes 169) that restricts the movement of the light guide member holder 161. Specifically, the holder stopper projections 164 of the light guide member holder 161 and the stopper holes 169 of the base member 166 restrict the movement of the light guide member holder 161. According to such a configuration, the position of the light guide member holder 161 can be determined step by step in several positions with respect to the base member 166. Therefore, the extra portion of the light guide member 33 can be absorbed appropriately and easily according to the loosening degree of the light guide member 33. Since the position of the light guide member holder 161 is determined and fixed with respect to the base member 166, the light guide member holder 161 is less likely to be moved in a direction in which the light guide member 33 is loosened during the running of the vehicle.

The door trim 1, which is the vehicular interior component, includes the upper board 12, the lower board 13, and the pocket board 15 (one example of a combination of at least two plate members) that are connected to each other. The door trim 1 further includes the door inside handle bezel 3, the armrest 4, and the door pocket 5. The door trim 1 includes the through holes (the slit S, the through hole 13H, the long holes 17, 19) in the door inside handle bezel 3, the armrest 4, the door pocket 5, and near the border section between the connected two plate members. The light guide member 33 is routed to connect at least two points having the through holes included in the door inside handle bezel 3, the armrest 4, the door pocket 5, and the border section between the connected two plate members. According to such a configuration, the single light guide member 33 can be arranged to be opposite the multiple lighting portions (the lighting holes including the through hole 13H and the slit S) while keeping good mounting operability with respect to the door trim 1 and adjusting the loosening of the light guide member 33 appropriately.

The configuration of a door trim 310 and the trim board 311 will be further described with reference to FIGS. 1, 2, 21, and 22. The components of the door trim 310 and the trim board 311 designated by the same symbols as those of the components described above have configurations similar to those of the door trim 1 and the trim board 2. The armrest 4 has the upper surface 4A that horizontally extends and includes an armrest hole that opens upward in a front section of the upper surface 4A. Operation switches for opening and closing a door window is arranged in the armrest hole.

The door grip 7 extends frontward from the armrest 4. The door grip 7 extends obliquely upward from the front portion of the horizontal upper surface 4A of the armrest 4. The door grip 7 is away from the vehicular interior surface of the lower board 13 such that an occupant easily holds the door grip 7. The door grip 7 is integrally formed with the lower board 13 at the front end portion thereof and is fixed to the trim board 2, 311.

Figure 21:
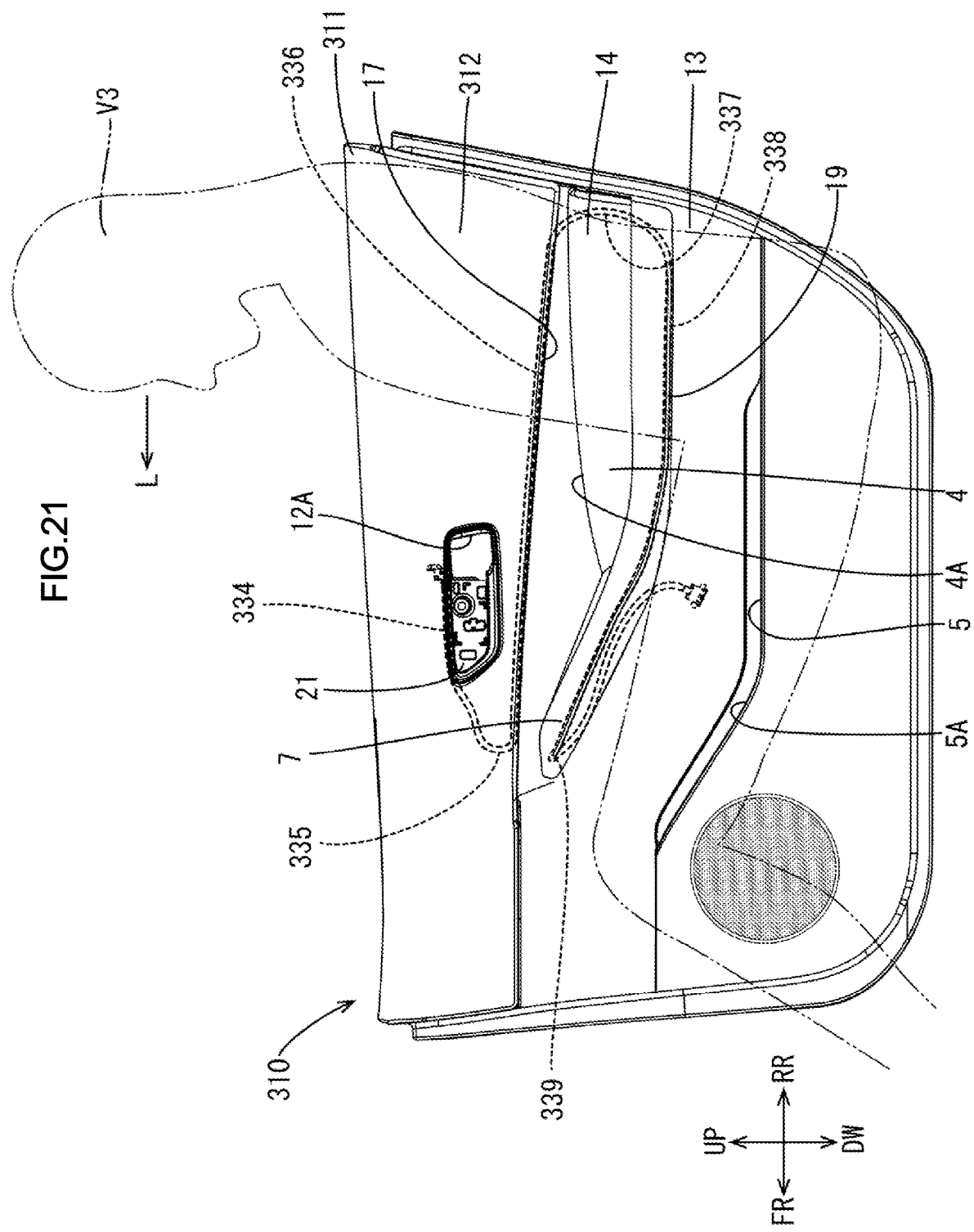
FIG. 21 is a front surface side view of a door trim seen from the vehicular interior side.
Figure 23:
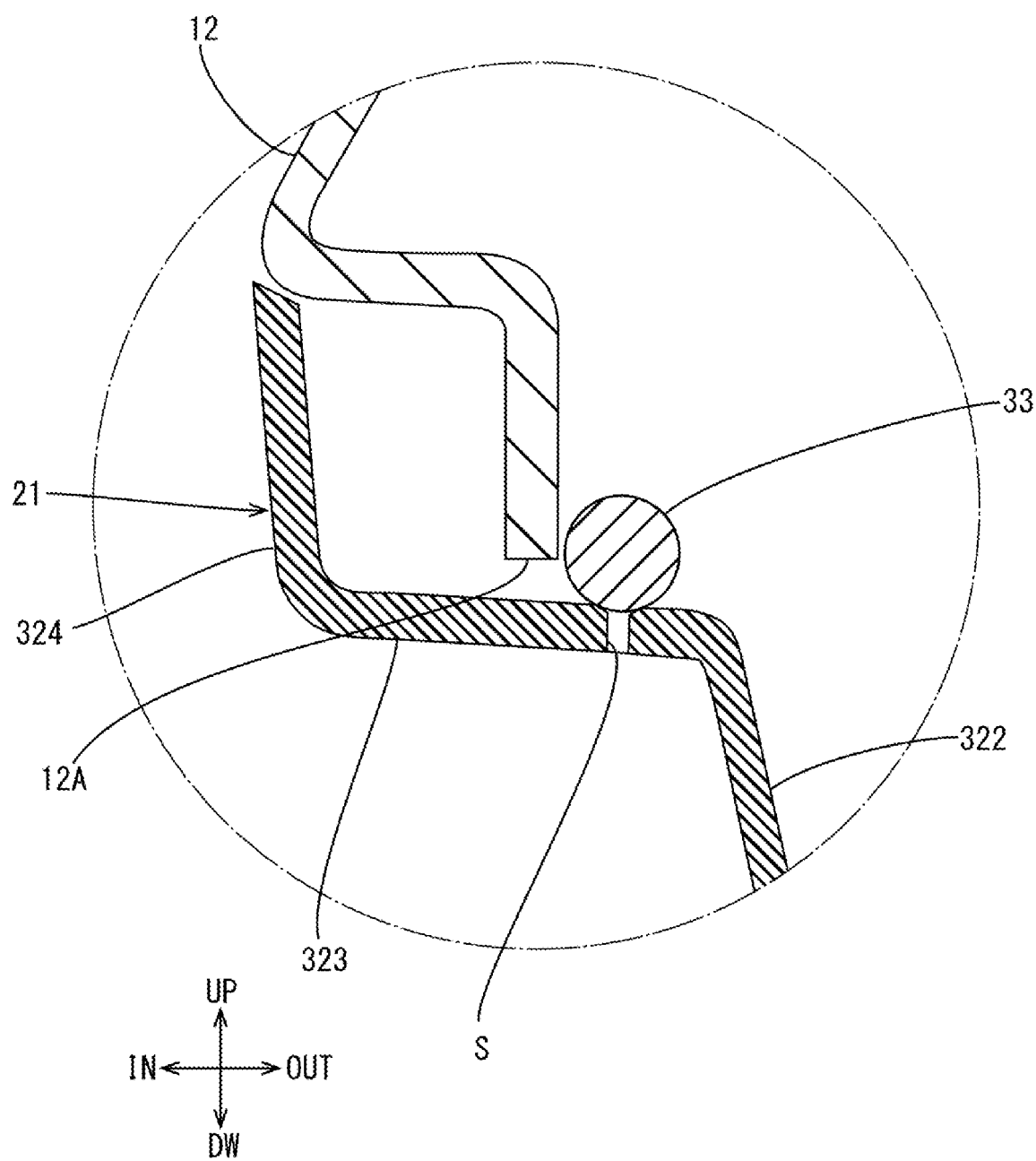
FIG. 23 is a cross-sectional view illustrating a portion of the door trim taken along D-D line in FIG. 22.

As illustrated in FIGS. 1 and 21, the upper board 12, 312 includes a door inside handle bezel 21 (the handle housing portion) above the operation switches and near the border section of the upper board 12, 312 and the lower board 13. The inside handle bezel 3, 21 (the handle housing portion) is mounted in the handle hole 12A of the upper board 12, 312 from the vehicular interior side. As illustrated in FIG. 23, the inside handle bezel 21 includes a base wall 322, side walls, and a flange portion 324. The side walls extend from outer edges of the base wall 322 toward the vehicular interior side. An upper side wall 323 of the side walls is illustrated in FIG. 23. The flange portion 324 extends outwardly from extended ends of the side walls.

The inside handle bezel 21 is mounted in the handle hole 12A such that the flange portion 324 overlaps the hole edge of the handle hole 12A from the vehicular interior side. Accordingly, the inside handle bezel 3, 21 has a recessed surface that is recessed toward the vehicular exterior side from the vehicular interior side surface of the upper board 12, 312. An inside handle that is for opening and closing a vehicular door is arranged in the inside handle bezel 3, 21.

The trim board 2, 311 includes the door pocket 5 below the armrest 4 and the door grip 7. The door pocket 5 is defined by the lower board 13 and the pocket board 15 that is arranged on the vehicular exterior side with respect to the lower board 13. The door pocket 5 includes the pocket opening 5A that is open upward and objects can be stored in the door pocket 5. The pocket opening 5A is a long opening that extends in the vehicular front-rear direction. The door pocket 5 is below the armrest 4 and the door grip 7 and is away from lower edges of the armrest 4 and the door grip 7, respectively.

Figure 22:
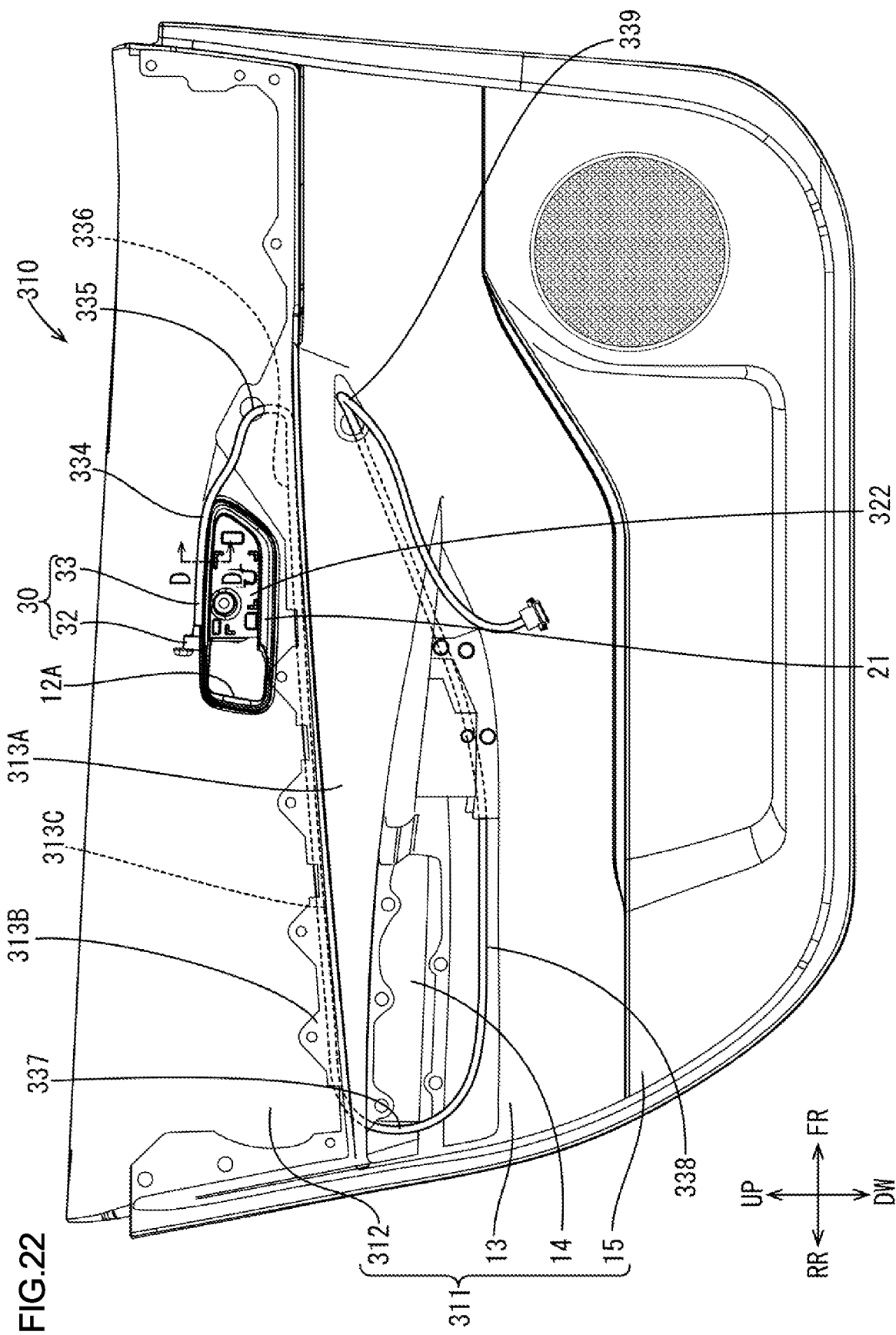
FIG. 22 is a back surface side of the door trim seen from the vehicular exterior side.

As illustrated in FIGS. 2 and 22, the lower board 13 includes a body portion 313A and mount pieces 313B that project upward from an upper edge of the lower board 13. The mount pieces 313B of the lower board 13 are overlapped with an edge of the upper board 12, 312 from the vehicular exterior side. The mount pieces 313B are fixed to the upper board 12, 312 with screws, for example.

The light guide member 33 is connected to the LED case 32 such that the end surface 33B of the light guide member 33 is opposite the light emission surface of the LED 31. The end surface 33B is a light entering surface through which the light emitted by the LED 31 enters. As illustrated in FIG. 24, if the light that travels within the light guide member 33 reaches an interface between the light guide member 33 and the external air layer at an incident angle that is greater than the critical angle, the light travels within the light guide member 33 with total internal reflection. The light travels within the light guide member 33 toward the end surface 33A that is opposite from the end surface 33B.

As described before, the peripheral surface (side surface) of the light guide member 33 is coated with fluorocarbon polymers and the light that travels within the light guide member 33 exits outward through the peripheral surface. The light rays that enter the light guide member 33 through the end surface 33B, which is the light entering surface, travel within the light guide member 33 while repeating the total internal reflection and some of the light rays exit the light guide member 33 through the entire outer peripheral surface during the travel within the light guide member 33. The whole light guide member 33 is a linear light source and supplies light to the surroundings. Thus, the outer peripheral surface of the light guide member 33 is a light exit surface and the light that enters the light guide member 33 through the end surface 33B, which is the light entering surface, exits through the outer peripheral surface of the light guide member 33.

In the lighting device 30, the light travels within the light guide member 33 in a light travel direction. The light travel direction of the light that travels within the light guide member 33 and the direction of the sight line of the viewer who sees the light exiting the light guide member 33 affect the luminosity factor, which represents how the light is seen by the viewer. The luminosity factor is determined by the light travel direction and the direction of the sight line. Among the light rays that exit the light guide member 33 through the peripheral surface, the amount of light rays that exit through the peripheral surface of the light guide member 33 in the light travel direction is greater than the amount of light rays that exit through the peripheral surface in an opposite direction from the light travel direction.

When the light travel direction in which the light travels within the light guide member 33 is substantially opposite from the direction of the sight line of the eyes of the viewer V1 as illustrated in FIG. 24, the luminosity factor of the light rays that the viewer V1 sees is high. When the light travel direction in which the light travels within the light guide member 33 is substantially same as the direction of the sight line of the eyes of the viewer V2 as illustrated in FIG. 24, the luminosity factor of the light rays that the viewer V2 sees is lower than that of the light rays that the viewer V1 sees.

A great amount of light rays is desired to be supplied to some portions of the door trim 1, 310, such as the inside handle bezel 3, 21, the upper surface 4A of the armrest 4, and the pocket opening 5A such that the portions are lighted brightly for the viewers who are on the vehicle. Among the portions, the upper surface 4A of the armrest 4 that includes the operation switches is desired to be lighted most brightly. The upper surface 4A is referred to as a first portion that is desired to be lighted most brightly. The inside handle bezel 3, 21 and the pocket opening 5A are to be lighted less brightly than the upper surface 4A. The inside handle bezel 3, 21 and the pocket opening 5A are referred to as a second portion that is to be lighted less brightly than the first portion.

The lighting device 30 is arranged with respect to the trim board 311 as follows. As illustrated in FIG. 22, the LED case 32 (the LED 31) of the lighting device 30 is arranged near an upper rear corner of the base wall 322 of the inside handle bezel 21 and on the exterior side with respect to the inside handle bezel 21. The light guide member 33 that extends from the LED case 32 is arranged along an upper surface of the upper side wall 323 to extend toward the front side. As illustrated in FIGS. 1, 3, 21, the light guide member 33 includes a first routing portion 334 that extends from the LED case 32 toward the front side. As illustrated in FIG. 23, the upper side wall 323 of the inside handle bezel 21 includes a slit S that extends in the front-rear direction. The light guide member 33 is fixed to the upper board 12, 312 such that the first routing portion 334 is opposite the vehicular interior space (an inner space of the inside handle bezel 21) through the slit S. The light that exits the first routing portion 334 of the light guide member 33 is supplied to the inner space of the inside handle bezel 21 through the slit S.

As illustrated in FIGS. 1 and 21, the viewer V3 is seated on the rear side with respect to the inside handle bezel 3, 21 (the handle housing portion, the first portion) in the front-rear direction and the direction of sight line L of the viewer V3 is a frontward direction, which is a vehicle running direction (a second light travel direction). As illustrated in FIG. 3, the light that travels within the first routing portion 334 of the light guide member 33 from the vehicular rear side toward the vehicular front side, that is, in the vehicle running direction. Namely, the light travel direction in the first routing portion 334 is an about same direction as the direction of the sight line L of the viewer V3. The light travels in the first routing portion 334 in a direction in which the light travels farther away from the eyes of the viewer V3. Therefore, the light that is supplied through the slit S toward the inner space of the inside handle bezel 3, 21 has a low luminosity factor and is less likely to be seen by the viewer V3.

As illustrated in FIGS. 1, 3, and 22, the light guide member 33 includes a first curved portion 335 that is continuous from the first routing portion 334 and curved and extends rearward in a section on the front side of the inside handle bezel 3, 21. The light guide member 33 further includes a second routing portion 336 (one example of a first routing portion) that is continuous from the first curved portion 335 and extends rearward along the border section between the upper board 12, 312 and the lower board 13.

As previously described, the mount pieces 313B of the lower board 13 are overlapped with the edge of the upper board 12, 312 from the vehicular exterior side and are fixed to the upper board 12, 312. Specifically, bosses that project from the vehicular exterior side surface of the upper board 12, 312 are inserted in through holes of the mount pieces 313B, respectively, and are fixed to the lower board 13 with fixing means such as screws or welding. The lower board 13 includes a recessed portion 313C on the edge of the body portion 313A and near basal portions of the mount pieces 313B. The recessed portion 313C extends along the edge of the body portion 313A and are recessed toward the vehicular exterior side. The second routing portion 336 of the light guide member 33 is arranged in the recessed portion 313C. The trim board 2, 311 includes the long hole 17 between a lower edge of the upper board 12, 312 and the upper edge of the body portion 313A. The long hole 17 extends in the front-rear direction.

The second routing portion 336 of the light guide member 33 extends along the border section between the upper board 12, 312 and the lower board 13 and is arranged in the recessed portion 313C such that the second routing portion 336 is opposite the vehicular interior space through the long hole 17. Some of the light rays that are supplied to the vehicular interior space through the long hole 17 and the upper surface 4A of the armrest 4 is lighted.

The light travels in the second routing portion 336 from the front side to the rear side (in a first light travel direction) and the light that exits through the long hole 17 also travels rearward. Namely, the light travel direction in the second routing portion 336 is opposite from the direction of the sight line L of the viewer V3. The light travels in the second routing portion 336 in a direction in which the light travels closer to the eyes of the viewer V3. Therefore, the light that is supplied from the second routing portion 336 through the long hole 17 toward the upper surface 4A has a higher luminosity factor and brighter than the light that is supplied to the inner space of the inside handle bezel 3, 21.

The light guide member 33 includes a second curved portion 337 (one example of a curved portion) that is continuous from the second routing portion 336 and curved and extends frontward in a rear end of the border section between the upper board 12, 312 and the lower board 13. The light guide member 33 further includes a third routing portion 338 (one example of a second routing portion) that is continuous from the second curved portion 337 and extends frontward along a lower surface of the armrest 4. The third routing portion 338 further extends frontward along a lower surface of the door grip 7 from the armrest 4. As previously described, the door grip 7 has a tubular shape and is away from the vehicular interior surface of the lower board 13. Therefore, the front section of the third routing portion 338 extends out from the back surface of the lower board 13 to the vehicular interior side and arranged on an inner surface (a surface opposite from a design surface) of the door grip 7.

As illustrated in FIGS. 1 and 21, the trim board 2, 311 includes a long hole 19 in the lower surfaces of the armrest 4 and the door grip 7. The long hole 19 extends continuously along the armrest 4 and the door grip 7. The third routing portion 338 of the light guide member 33 is arranged to be opposite the vehicular interior space through the long hole 19. Some of the light rays that are supplied downward to the vehicular interior space through the long hole 19 and the pocket opening 5A of the door pocket 5 is lighted.

The light travels in the third routing portion 338 in the frontward direction (a second light travel direction), which is the vehicle running direction, and the light that exits through the long hole 19 also travels frontward. Namely, the light travel direction in the third routing portion 338 is same as the direction of the sight line L of the viewer V3. The light travels in the third routing portion 338 in a direction in which the light travels farther away from the eyes of the viewer V3. Therefore, the light that is supplied from the third routing portion 338 through the long hole 19 toward the pocket opening 5A has a lower luminosity factor and darker than the light that is supplied to the upper surface 4A of the armrest 4 through the long hole 17.

The light guide member 33 further includes a third curved portion 339 that is continuous from the third routing portion 338 and extends into the back surface side (the vehicular exterior surface side) of the trim board 2, 311 (the lower board 13) and is folded at the front end of the door grip 7 toward the rear side. The light guide member 33 further includes an end portion that is continuous from the third curved portion 339 and the end portion is fixed to the back surface of the lower board 13 so as not to be contacted with other components.

The light guide member 33 is arranged on the door trim 1, 310 such that the light travel direction in which the light travels within the light guide member 33 is close to the direction in which the light travels closer to the eyes of the viewer V3 in the first portion that is to be lighted brightly for the viewer V3, for example, on the upper surface 4A of the armrest 4. Furthermore, the light guide member 33 is arranged on the door trim 1, 310 such that the light travel direction in which the light travels within the light guide member 33 is close to the direction in which the light travels farther away from the eyes of the viewer V3 in the second portion that is to be lighted less brightly than the first portion, for example, in the inside handle bezel 3, 21 and the pocket opening 5A.

In the prior configuration of the lighting device, in order to supply light to multiple portions in the vehicle, light sources and light guide members are necessary for the respective portions and this increases cost. To provide different brightness in the multiple portions, multiple light sources and light guide members are necessary.

An elongated light guide member may be arranged via the portions to be lighted without increasing the number of light sources and light guide members. The light guide member may be processed to have V-shaped grooves on a surface or have an embossed surface such that some of the light rays from the light source may be scattered at the surface to adjust how the light is seen by the viewer. This may increase processing cost and the number of process steps.

According to the mounting assembly of the lighting device 30 and the door trim 1, 310, the lighting device 30 includes the LED 31 and the elongated light guide member 33 through which the light from the LED 31 travels and the door trim 1, 310 includes the first portion that is to be lighted brightly for the viewer V3 who is on the vehicle and the second portion that is to be lighted less brightly than the first portion. The light guide member 33 includes the first curved portion 335 and the second curved portion 337. The light that is emitted by the LED 31 and enters through the end surface 33B travels within the light guide member 33 toward the end surface 33A. The light exits the light guide member 33 toward the vehicular interior space while travelling within the light guide member 33. The light guide member 33 is arranged such that the light travel direction from the end surface 33B toward the end surface 33A is close to the direction in which the light exiting the light guide member 33 travels closer to the eyes of the viewer V3 in the first portion and the light travel direction is close to the direction in which the light exiting the light guide member travels farther away from the eyes of the viewer V3 in the second portion.

Since the single light guide member 33 is arranged with the above configuration, the first portion can be lighted brightly for the viewer V3 and the second portion can be lighted less brightly than the first portion for the viewer V3 without using multiple light sources and light guide members having different brightness. Thus, the multiple portions of the door trim 1, 310 can be lighted with different luminosity factors with using a single light guide member.

The light guide member 33 is arranged such that the light travel direction from the end surface 33B toward the end surface 33A is close to the direction in which the light exiting the light guide member 33 travels from the front side toward the rear side of the door trim 1, 310 in the first portion and the light travel direction is close to the direction in which the light exiting the light guide member 33 travels from the rear side toward the front side of the door trim 1, 310 in the second portion.

The direction of the sight line L of the viewer V3 is same as the vehicle running direction.

The door trim 1, 310 includes the armrest 4, the door pocket 5 disposed below the armrest 4, and the inside handle bezel 3, 21 (the handle housing portion). The first portion includes the upper surface 4A of the armrest 4. The second portion includes a portion of the trim board 2, 311 ranging from the lower surface of the armrest 4 to the pocket opening 5A of the door pocket 5 and the inside handle bezel 3, 21 (the handle housing portion).

According to such a configuration, the upper surface 4A of the armrest 4 can be lighted brightly for the viewer V3 and the door pocket 5 and the inside handle bezel 21 are lighted less brightly than the upper surface 4A of the armrest 4.

<Other Embodiments>

The technology described herein is not limited to the embodiments described above with reference to the drawings. The following embodiments may be included in the technical scope. The technology described herein may be modified within the technical scope.

(1) In the lighting device of the above embodiments, the shape, the arrangement, and the configuration of the light guide member 33 and the LED 31 (light source) may be varied as appropriate. For example, the cross-sectional shape of the light guide member 33 is not limited to the circular shape but may be a polygonal shape or an oval shape. The light guiding mechanism of the light guide member 33 may be altered. The routing arrangement of the light guide member 33 is not limited to the above one and the light guide member may be disposed to be routed in any other portions such as a portion around the speaker grill 8.

(2) In the above embodiment, the upper board 12 includes the receiving member 12D and the connection wall 12C of the receiving member 12D is a plate member. The connection wall 12C (the wall) is vertical to the upper side wall 3BU. However, the configuration of the wall of the trim board 2 is not limited to the above one. For example, the wall may extend directly from the upper side wall 3BU of the door inside handle bezel 3.

(3) In the above embodiments, the light guide member 33 that is supported by and covered with the elastic member 45 may be fixed to the door trim 1 and arranged along the slit S as described below. The upper side wall 3BU may include fixing pieces on the vehicular exterior side surface thereof so as to sandwich the slit S therebetween. The edge portions 47 of the elastic member 45 may be fitted to the respective fixing pieces and the clip 40 can fix the positions of the light guide member 33 and the elastic member 45 stably. Accordingly, the light guide member 33 that is supported by the clip 40 can be fixed to the door trim more easily.

(4) In the above embodiments, the clip 40 is mounted on the light guide member 33 via the elastic member 45. However, the clip 40 may be directly mounted on the light guide member 33 without including the elastic member 45. In such a configuration, the cover portion of the clip may have a curvature that is equal to or slightly smaller than a curvature of the peripheral surface of the light guide member 33 such that the inner surface of the cover portion is closely contacted with the peripheral surface of the light guide member 33.

(5) In the above embodiments, the door trim 1 includes only one lighting device 30. However, the door trim 1 may include another lighting device in addition to the lighting device 30 as long as the lighting device 30 mounted on the door trim 1 exerts the lighting function in the portions of the door trim 1.

(6) In the above embodiments, the door trim 1 that is an interior component of a vehicular door is included as the vehicular interior component. However, the interior component on which the lighting device 30 is mounted is not limited to the above example. For example, examples of vehicles including the interior component may be a train, an amusement vehicle, an autonomous vehicle, an airplane, a helicopter, a ship, and a submarine. Examples of the interior components include a roof lining, a side trim, an instrument panel, and a pillar garnish.

(7) The mounting mechanism of mounting the light guide member holder 159 on the door trim 1 (the trim board 2) is not limited to the configuration described in the above embodiment as long as the light guide member holder 159 can be mounted on the door trim 1 (the trim board 2). For example, the light guide member holder 159 may be mounted on the door trim 1 (the trim board 2) with other fixing mechanism or screwing.

(8) The support portion 150 may not include the outer support portion 154 and the lid portion 155. The light guide member holder 159 may be integrally included with the door trim 1 (the trim board 2).

(9) The shape, arrangement, and configuration of the light guide member and the light source may be altered as appropriate. The light guide member may include one curved portion or three or more curved portion. The routing arrangement of the light guide member 33 is not limited to the one described in the above embodiments. The light guide member may not be arranged to extend horizontally but may be arranged to extend vertically. In such a configuration, the luminosity factor of the light rays that the viewer sees is adjusted by arranging the light guide member such that the light travel direction is close to the direction in which the light exiting the light guide member travels closer to the eyes of the viewer or the light travel direction is close to the direction in which the light exiting the light guide member travels farther away from the eyes of the viewer. Furthermore, the light source may be mounted on the end portion having the end surface 33A.

(10) The long hole 17 is between the lower edge of the upper board 12, 312 and the upper edge of the lower board 13. However, the trim board may not include several board members and may be molded in one single component. In such a configuration, the trim board may include a long hole.

(11) The curved portions 335, 337 have a U-shape; however, curved portions may have several L-shaped corners.

(12) The light from the lighting device 30 is supplied to operation sections used by a vehicle occupant. However, the light from the lighting device may be used for decorative lighting for the vehicular interior space.

(13) The lighting device 30 is mounted on the door trim 1, 310 for a vehicle. However, the present technology may be applied to a ceiling, a console, or an instrument panel and may be applied to a mounting assembly of a lighting device and a vehicular interior component of vehicles other than automobiles, such as air planes.

The invention claimed is:

1. A mounting assembly of a lighting device and a vehicular interior component, the mounting assembly comprising:
   the lighting device including
      a light source, and
      a light guide member that is long and includes a first end portion having a first end surface as a light entering surface through which light emitted by the light source enters and a second end portion having a second end surface that is an opposite end from the first end surface, the light guide member within which light emitted by the light source travels;
   the vehicular interior component having a plate shape and having a vehicular interior surface and a vehicular exterior surface, the vehicular interior component including
      a through hole that extends from the vehicular interior surface to the vehicular exterior surface, and
      a receiving member including a stopper hole near the through hole; and
   a light guide member mounting member with which the light guide member is mounted on a vehicular exterior surface side of the vehicular interior component, the light guide member mounting member including a light guide member holder that is disposed on the vehicular exterior surface side of the vehicular interior component, the light guide member holder including
      a support portion including a curved wall having a space that is defined by the curved wall, the curved wall receiving and supporting a portion of the light guide member in the space to be opposite the through hole such that the light exits the light guide member is supplied to a vehicular interior surface side of the vehicular interior component, and
      a fitting portion that extends from the support portion and is fitted to the stopper hole of the receiving member,
   wherein the through hole is a long through hole having two long hole edges that are opposite each other and the portion of the light guide member is contacted with the two long hole edges of the through hole.

2. The mounting assembly of a lighting device and a vehicular interior component according to claim 1, wherein the light guide member mounting member further includes an intermediate member that covers the portion of the light guide member and is disposed between the portion of the light guide member and the curved wall.

3. The mounting assembly of a lighting device and a vehicular interior component according to claim 1, wherein the support portion includes an opening that is opposite and continuous to the through hole and the light that exits the light guide member is supplied to the vehicular interior side through the opening and the through hole.

4. The mounting assembly of a lighting device and a vehicular interior component according to claim 1, wherein
   the through hole is a long through hole and the portion of the light guide member extends along the long through hole,
   the light guide member holder further includes a connection portion that is a plate member and extends upward from an outer circumferential surface of the curved wall to the fitting portion and extends in an axial direction of the light guide member, and the fitting portion extends from a plate surface of the connection portion in a direction crossing the plate surface of the connection portion.

5. The mounting assembly of a lighting device and a vehicular interior component according to claim 2, wherein the intermediate member has light blocking properties.

6. The mounting assembly of a lighting device and a vehicular interior component according to claim 5, wherein the intermediate member is made of elastic deformable material.

7. The mounting assembly of a lighting device and a vehicular interior component according to claim 1, wherein
the light guide member mounting member further includes an intermediate member that covers the portion of the light guide member and is disposed between the portion of the light guide member and the curved wall,
the intermediate member is made of elastic deformable material and is an elongated member that is longer than a longitudinal dimension of the long through hole and the intermediate member has an arched shape that follows a shape of the curved wall, and
the intermediate member covers the portion of the light guide member with respect to a longitudinal direction and a circumferential direction of the light guide member.

8. The mounting assembly of a lighting device and a vehicular interior component according to claim 4, wherein
the fitting portion includes two plate pieces that extend from the plate surface of the connection portion in the direction crossing the plate surface of the connection portion and are opposite each other,
the plate pieces include stopper projections, respectively, at extended end portions of the plate pieces, and
the stopper projections are fitted into the stopper hole and stopped at a hole edge of the stopper hole.

9. A mounting assembly of a lighting device and a vehicular interior component, the mounting assembly comprising:
the lighting device including
a light source, and
a light guide member that is elongated and includes a first end portion having a first end surface as a light entering surface through which light emitted by the light source enters and a second end portion having a second end surface that is an opposite end from the first end surface, the light guide member within which light emitted by the light source travels;
the vehicular interior component having a plate shape and having a vehicular interior surface and a vehicular exterior surface, the vehicular interior component including
a through hole that extends from the vehicular interior surface to the vehicular exterior surface, and
a receiving member including a stopper hole adjacent the through hole; and
a light guide member mounting member with which the light guide member is mounted on a vehicular exterior surface side of the vehicular interior component, the light guide member mounting member including a light guide member holder that is disposed on the vehicular exterior surface side of the vehicular interior component, the light guide member holder including
a support portion including a curved wall having a space that is defined by the curved wall, the curved wall receiving and supporting a portion of the light guide member in the space to be opposite the through hole such that the light exits the light guide member is supplied to a vehicular interior surface side of the vehicular interior component, and
a fitting portion that extends from the support portion and is fitted to the stopper hole of the receiving member,
the mounting assembly further comprising:
a light blocking cover including a body portion and flange portions,
the body portion having a tubular shape and receiving another portion of the light guide member in a space of the body portion, the body portion including a separation portion extending in an axial direction of the body portion, the body portion having two long edges at the separation portion, and
the flange portions projecting outward from long edge portions of the body portion including the two long edges, respectively, in a radial direction and the flange portions extending along the two long edge, respectively, wherein
the vehicular interior component further includes a holding member that includes two wall portions projecting from the vehicular exterior surface of the vehicular interior component to be opposite each other,
the light blocking cover that receives the other portion of the light guide member in the space is arranged between the two wall portions, and
the flange portions that are overlapped with each other are held by projected end portions of the wall portions.

10. The mounting assembly of a lighting device and a vehicular interior component according to claim 1, wherein
the vehicular interior component further includes another through hole that extends from the vehicular interior surface to the vehicular exterior surface, and
the light guide member is routed via the through hole and the other through hole.

11. The mounting assembly of a lighting device and a vehicular interior component according to claim 7, wherein
the intermediate member includes an arched portion and edge portions, the arched portion is an elongated member having an arched shape and has two long edges, and the edge portions extend from the two long edges, respectively, outward in a radial direction of the arched portion and extend along the two long edges, and
the arched portion is contacted with a peripheral surface of the light guide member and the edge portions are contacted with the vehicular exterior side surface of the vehicular interior component near the through hole.

12. A mounting assembly of a lighting device and a vehicular interior component, the mounting assembly comprising:
the lighting device including
a light source, and
a light guide member that is elongated and includes a first end portion having a first end surface as a light entering surface through which light emitted by the light source enters and a second end portion having a second end surface that is an opposite end from the first end surface, the light guide member within which light emitted by the light source travels;
the vehicular interior component having a plate shape and having a vehicular interior surface and a vehicular exterior surface, the vehicular interior component including
a through hole that extends from the vehicular interior surface to the vehicular exterior surface, and a receiving member including a stopper hole adjacent the through hole; and a light guide member mounting member with which the light guide member is mounted on a vehicular exterior surface side of the vehicular interior component, the light guide member mounting member including a light guide member holder that is disposed on the vehicular exterior surface side of the vehicular interior component, the light guide member holder including a support portion including a curved wall having a space that is defined by the curved wall, the curved wall receiving and supporting a portion of the light guide member in the space to be opposite the through hole such that the light exits the light guide member is supplied to a vehicular interior surface side of the vehicular interior component, and a fitting portion that extends from the support portion and is fitted to the stopper hole of the receiving member, wherein the vehicular interior component includes a board member and a door inside handle bezel, and the receiving member is included in the board member and the through hole is included in the inside handle bezel.

13. The mounting assembly of a lighting device and a vehicular interior component according to claim 1, wherein the portion of the light guide member received in the space of the curved wall is the second end portion of the light guide member and the second end surface of the light guide member is opposite the through hole while keeping a distance between the second end surface and the vehicular exterior surface of the vehicular interior component.

14. The mounting assembly of a lighting device and a vehicular interior component according to claim 13, wherein the light guide member mounting member further includes a sleeve that is a tubular member in which the second end portion of the light guide member is inserted, the sleeve includes slits at one end portion of the sleeve and the slits extend in an axial direction of the sleeve, the support portion further includes a base portion and the curved wall, the base portion includes a communication hole that is continuous to the through hole, and the curved wall extends from the base portion and is a tubular wall and a distance between opposing wall portions of the curved wall is reduced as the curved wall extends toward the base portion, and the space is defined by the curved wall and the base portion and the second end portion of the light guide member that is inserted through the sleeve is put in the space and the second end surface is outside the sleeve and is closer to the through hole than an end of the sleeve is.

15. The mounting assembly of a lighting device and a vehicular interior component according to claim 14, wherein according to movement of the sleeve along the light guide member toward the base portion while the second end surface being contacted with the base portion in the space, a width of each of the slits is reduced such that the sleeve holds the second end portion in the space and a position of the second end surface is defined.

16. The mounting assembly of a lighting device and a vehicular interior component according to claim 14, wherein the sleeve includes a body portion that includes the slits at one end thereof and a flange portion at another end of the body portion, the flange portion extends outward from the other end of the body portion in a radial direction, the curved wall has a top surface at an extended end thereof, and the second end surface is contacted with the base portion and the top surface is contacted with the flange portion when the second end portion of the light guide member that is inserted in the sleeve is in the space that is defined by the curved wall and the base portion.

17. The mounting assembly of a lighting device and a vehicular interior component according to claim 13, wherein the receiving member includes a base body portion having a flat surface that is the vehicular exterior side surface, the base portion has an inner surface that faces the space and an outer surface that is an opposite surface of the inner surface and is a flat surface, and the outer surface and the flat surface are contacted with each other and the communication hole is continuous to the through hole when the light guide member holder is mounted on the vehicular interior component.

18. The mounting assembly of a lighting device and a vehicular interior component according to claim 1, further comprising a tension adjuster disposed on the vehicular exterior surface side of the board member, the tension adjuster including a base member having a plate shape and including a guide hole that is long in a longitudinal direction, and a holder holding the light guide member and including a holder body portion and an extended portion that extends from the holder body portion and is fitted in the guide hole such that the holder is moved along the guide hole.

19. The mounting assembly of a lighting device and a vehicular interior component according to claim 18, wherein the vehicular interior component further includes another through hole, and the tension adjuster is disposed between the through hole and the other through hole such that the longitudinal direction of the guide hole cross a line connecting the through hole and the other through hole.

20. The mounting assembly of a lighting device and a vehicular interior component according to claim 18, wherein the holder body portion has a front surface and a back surface and includes stopper projections projecting from the back surface, the extended portion extends from the back surface, and the light guide member is supported on the front surface, and the base member includes stopper holes in which the stopper projections are fitted such that a position of the holder with respect to the base member is fixed.

21. The mounting assembly of a lighting device and a vehicular interior component according to claim 17, wherein the vehicular interior component includes a door pocket having a pocket opening, the base body portion of the receiving member is above the pocket opening, and the light that travels within the light guide member and exits through the second end surface is supplied through the communication hole and the through hole toward the pocket opening.

22. A mounting assembly of a lighting device and a vehicular interior component, the mounting assembly comprising:

the lighting device including a light source, and a light guide member that is elongated and includes a first end portion having a first end surface as a light entering surface through which light emitted by the light source enters and a second end portion having a second end surface that is an opposite end from the first end surface, the light guide member within which light emitted by the light source travels;

the vehicular interior component having a plate shape and having a vehicular interior surface and a vehicular exterior surface, the vehicular interior component including a through hole that extends from the vehicular interior surface to the vehicular exterior surface, and a receiving member including a stopper hole adjacent the through hole; and a light guide member mounting member with which the light guide member is mounted on a vehicular exterior surface side of the vehicular interior component, the light guide member mounting member including a light guide member holder that is disposed on the vehicular exterior surface side of the vehicular interior component, the light guide member holder including a support portion including a curved wall having a space that is defined by the curved wall, the curved wall receiving and supporting a portion of the light guide member in the space to be opposite the through hole such that the light exits the light guide member is supplied to a vehicular interior surface side of the vehicular interior component, and a fitting portion that extends from the support portion and is fitted to the stopper hole of the receiving member, wherein the light guide member includes a first routing portion and a second routing portion that are straight and a curved portion that is between the first routing portion and the second routing portion, the light travels within the first routing portion in a first light travel direction and travels within the second routing portion in a second light travel direction that is an opposite direction from the first light travel direction, the first light travel direction is a direction in which the light travels closer to a viewer who is on a vehicle and the second light travel direction is a direction in which the light travels farther away from the viewer, and the light guide member is arranged such that the first routing portion is adjacent to a first portion of the vehicular interior component that is to be lighted brightly and the second routing portion is adjacent to a second portion of the vehicular interior component that is to be lighted less brightly than the first portion.

23. The mounting assembly of a lighting device and a vehicular interior component according to claim 22, wherein the first light travel direction is a direction from a front side to a rear side of the vehicular interior component and the second light travel direction is a direction from the rear side to the front side.

\* \* \* \* \*